(12) United States Patent
Pedder et al.

(10) Patent No.: US 10,927,777 B2
(45) Date of Patent: Feb. 23, 2021

(54) METHODS AND SYSTEMS FOR A MULTI-FUEL ENGINE

(71) Applicant: Transportation IP Holdings, LLC, Norwalk, CT (US)

(72) Inventors: Jacob Kenneth Pedder, State College, PA (US); Garth Wade Mathe, Erie, PA (US); James Robert Mischler, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/457,490

(22) Filed: Jun. 28, 2019

(65) Prior Publication Data

US 2020/0003137 A1 Jan. 2, 2020

Related U.S. Application Data

(60) Provisional application No. 62/692,530, filed on Jun. 29, 2018.

(51) Int. Cl.
*F02D 41/00* (2006.01)
*F02D 19/08* (2006.01)

(52) U.S. Cl.
CPC ......... *F02D 41/003* (2013.01); *F02D 19/087* (2013.01); *F02D 2200/0611* (2013.01)

(58) Field of Classification Search
CPC ............. F02D 41/003; F02D 19/087; F02D 2200/0611; F02D 41/1497; F02D 2041/1433; F02D 2200/1004; F02D 41/2451; F02D 2200/1006; F02D 19/0647; F02D 41/0085; F02D 2200/0612; F02D 2250/18; F02D 41/0027; F02D 19/081; Y02T 10/30
See application file for complete search history.

(56) References Cited

U.S. PATENT DOCUMENTS 5,937,800 A * 8/1999 Brown ...................... F02B 7/06 123/27 GE
9,951,703 B2 4/2018 Pathan et al.

* cited by examiner

*Primary Examiner* — Jacob M Amick
*Assistant Examiner* — Charles Brauch
(74) *Attorney, Agent, or Firm* — McCoy Russell LLP

(57) ABSTRACT

Various methods and systems are provided for correcting relative error between a gaseous fuel torque estimate and a liquid fuel torque estimate in a multi-fuel engine. A system (e.g., a system for an engine) may include a controller with computer readable instructions stored on non-transitory memory that when executed during operation of the engine cause the controller to: operate the engine at a first substitution ratio of gaseous fuel and liquid fuel; correct for relative error between a gaseous fuel to torque conversion factor and a liquid fuel to torque conversion factor; and upon correcting for the relative error, operate the engine at a second substitution ratio, higher than the first substitution ratio.

20 Claims, 10 Drawing Sheets

METHODS AND SYSTEMS FOR A MULTI-FUEL ENGINE

CROSS REFERENCE TO RELATED APPLICATIONS

The present application claims priority to U.S. Provisional Application No. 62/692,530 entitled "METHODS AND SYSTEMS FOR A DUAL FUEL ENGINE", and filed on Jun. 29, 2018. The entire contents of the above-identified application are incorporated by reference for all purposes.

BACKGROUND

Technical Field

Embodiments of the subject matter disclosed herein relate to engine control, and relate to estimating fuel power contributions in a multi-fuel engine.

Discussion of Art

Some vehicles may include a multi-fuel engine that combusts more than one fuel in engine cylinders of the engine. As one example, a multi-fuel engine may combust both natural gas and diesel fuel. Adjusting fueling to the engine cylinders of the multi-fuel engine may include adjusting a substitution ratio of the two fuels delivered to the engine cylinders. As one example, the substitution ratio may be defined as a ratio of secondary fuel (e.g., natural gas) to total fuel (secondary fuel and primary fuel (e.g., diesel fuel)) delivered to the engine for combustion. To maintain emissions and generate desired engine power, the relative contribution to overall engine power derived from the first fuel and the relative contribution derived from the second fuel may be estimated based at least in part on measured engine parameters (such as speed) and commanded fueling amounts. It may be desirable to have a system and method that differs from those that are currently available.

BRIEF DESCRIPTION

In one embodiment, a system (e.g., a system for an engine) includes a controller with computer readable instructions stored on non-transitory memory that when executed during operation of the engine cause the controller to: operate the engine at a first substitution ratio of gaseous fuel and liquid fuel; correct for relative error between a gaseous torque estimate and a liquid torque estimate; and upon correcting for the relative error, operate the engine at a second substitution ratio, higher than the first substitution ratio.

DETAILED DESCRIPTION

Figure 1:
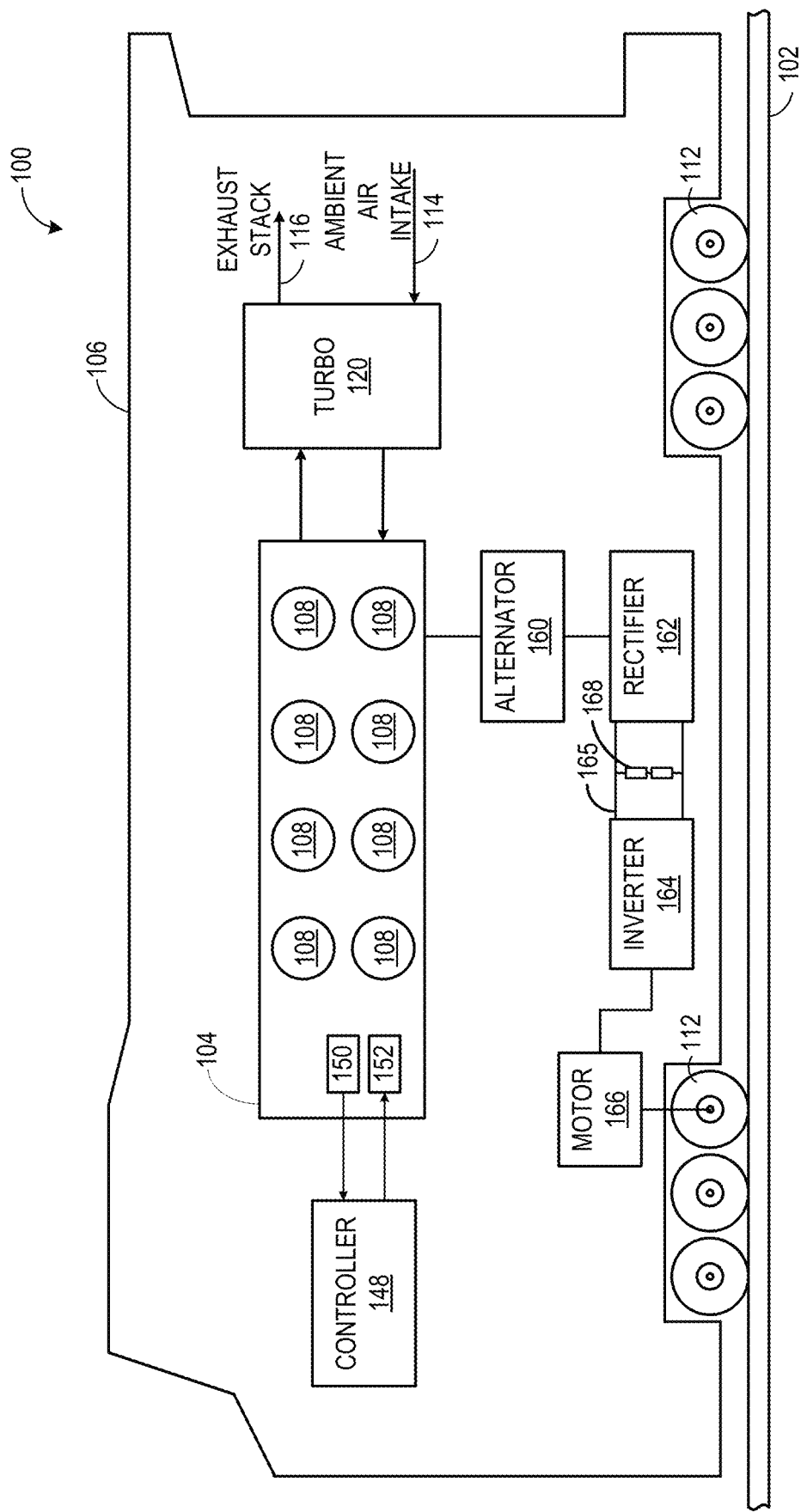
FIG. 1 shows a schematic diagram of a rail vehicle with an engine according to an embodiment of the disclosure.

The following description relates to a multi-fuel engine capable of combusting more than one type of fuel. For example, the engine may be able to combust both liquid fuel and gaseous fuel. Suitable liquid fuels may include gasoline, diesel and ethanol; and suitable gaseous fuels may include natural gas (e.g., methane), syn gas, and hydrogen. In one embodiment, a multi-fuel engine may operate in different modes at different times. In one mode, the engine may operate with only liquid fuel (where all engine power is derived from the combustion energy of the liquid fuel) and may switch to operate with a mixture of gaseous fuel and some liquid fuel (where a portion of the engine power that would otherwise be derived from combustion energy of the liquid fuel is instead derived from the combustion energy of the gaseous fuel). Hence, during multi-fuel operation, the engine may be operated with a commanded amount of gaseous fuel substituted for an amount of the liquid fuel, referred to as a substitution ratio. As used herein, the substitution ratio of natural gas is defined as the ratio of gas to total fuel (gas plus liquid fuel) delivered to the cylinders of the engine for combustion.

In some vehicle configurations, to control the engine to maintain engine emissions within a desired range, an accurate estimate of the engine's power is needed. In one example, the vehicle's engine controller may estimate engine power based at least in part on measured parameters (e.g., speed, pressures, etc.) and commanded fueling amounts (which may be determined from fuel injection durations). Such a configuration may allow a split between emissions-critical controls, maintaining emissions-critical portions within the engine controller rather than relying on other subsystems for engine power feedback (such as alternator load). In a multi-fuel engine, the engine power estimate may rely on an estimate of the engine power derived from the liquid fuel and the engine power derived from the gaseous fuel. While the engine power derived from the liquid fuel may be relatively accurate, even across different days and different vehicles, the engine power derived from the gaseous fuel may be prone to error, especially across different days and different vehicles. This is due to the fact that the composition of the gaseous fuel may vary greatly based at least in part on the source and processing of the gaseous fuel, and for some types of gaseous fuel, stratification in the fuel tank over time. For example, natural gas may have fractional content that is hydrocarbons of different chain lengths. A majority (or its entirety) may be methane, but longer chain hydrocarbons may be present in different amounts based at least in part on the source of the natural gas or its stratification (caused in part by the lower chain lengths having a tendency to boil off of liquefied natural gas preferentially over the longer chain hydrocarbons). Further, natural gas may have varying amounts of inert gas, such as nitrogen. The variation in composition of the natural gas or other gaseous fuel induces variation in gas properties, most notably in the fuel's heating value (e.g., energy content). Additionally, gaseous fuel injectors (and the associated gas admission valves) may exhibit batch to batch variation and/or piece to piece variation in gas flow rates, and wear over time. Accurate metering of gas flow through the gas admission valves is more difficult than through liquid fuel injectors. Accordingly, accurate knowledge of how much gaseous fuel is introduced into the engine, as well as accurate knowledge of the energy content of that fuel, is difficult to estimate, and further, it is also prohibitively expensive to use gas analyzers, etc., to test for gas composition and energy content. At least partly because of this, static calibration of the engine power estimate may too inaccurate to use across a fleet of equipment, or even a single vehicle of the fleet that is using a different gaseous fuel source.

A relatively high substitution ratio of natural gas to total fuel may be desired so that increased quantities of natural gas are combusted at the engine cylinders relative to diesel fuel. However, at high substitution ratios, the engine power estimate described above may be so inaccurate that emissions compliance may be compromised, engine degradation may occur, or other issues may be present that discourage or prevent the usage of the high substitution ratios. For example, a 5% error in a lower heating value (LHV) estimate may result in an acceptable 2.5% error in power at a substitution ratio (SR) of 50%, but at a SR of 90%, an unacceptable 4.5% power error may occur. Error in the engine power estimates may impact a variety of engine parameters, as the references (injection timing, fuel rail pressure, substitution ratio target, etc.) within the engine controller are a function of the controller's knowledge of power or torque. Therefore, larger errors will yield larger than desired deviations to the targets. Additionally, combustion events are prone to knock and high cylinder pressure at high substitution ratio, and thus accurate knowledge of the actual substitution ratio ensures that the substitution ratio may be maximized and that the engine is operating as near as possible to the substitution ratio limit without having direct feedback of cylinder pressure. The gaseous fuel introduces larger variation to the system than diesel fuel, for example. Thus, engines may be restricted to operating at substitution ratios of 60% or less, limiting the benefits of operating with gaseous fuel.

According to embodiments disclosed herein, changes in gaseous fuel energy content and variations in gas admission valve flow coefficients (which may affect gas admission flow rates) may be estimated and compensated for periodically and in real time using a gas accuracy test, allowing the power estimate of the gaseous fuel to approach the accuracy of the power estimate of the liquid fuel. The gas accuracy test estimates the relative error between the torque estimates of gaseous fuel and liquid fuel and provides a gas correction factor which minimizes this error. The test varies substitution ratio at steady state conditions and evaluates the disturbance on an engine speed regulation (also referred to as a torque loop) in order to determine the gas correction factor. Correcting the controller's estimated gaseous torque (also referred to as a gas-to-torque conversion term) significantly improves the accuracy of the gaseous fuel power estimate, and thereby allows operation at higher substitution ratios. Further, after the gas torque estimation error has been accounted for, a similar method may be applied to detect and correct for any errors in the liquid fuel torque estimation (also referred as to a liquid-to-torque conversion term). However, as the substitution ratio increases and the amount of injected liquid fuel decreases, the accuracy of the overall engine power estimate becomes limited by the accuracy of the liquid fuel power estimate due to operation in the ballistic zone of the liquid fuel injectors as well as other cylinder to cylinder variations. Thus, at least in some examples, once the estimated gaseous torque has been corrected, a cylinder balancing routine may be executed, where torque produced by each cylinder is sequentially adjusted (e.g., reduced) and the engine speed regulation compensation after each cylinder torque is adjusted is analyzed to determine if each cylinder is equally contributing to the overall engine torque output, which may enable still higher substitution ratios. Therefore, by correcting the gaseous torque estimation in the control system, gas torque knowledge may be as accurate as diesel torque knowledge, thereby allowing engine operation closer to the true substitution ratio upper limit.

Figure 2:
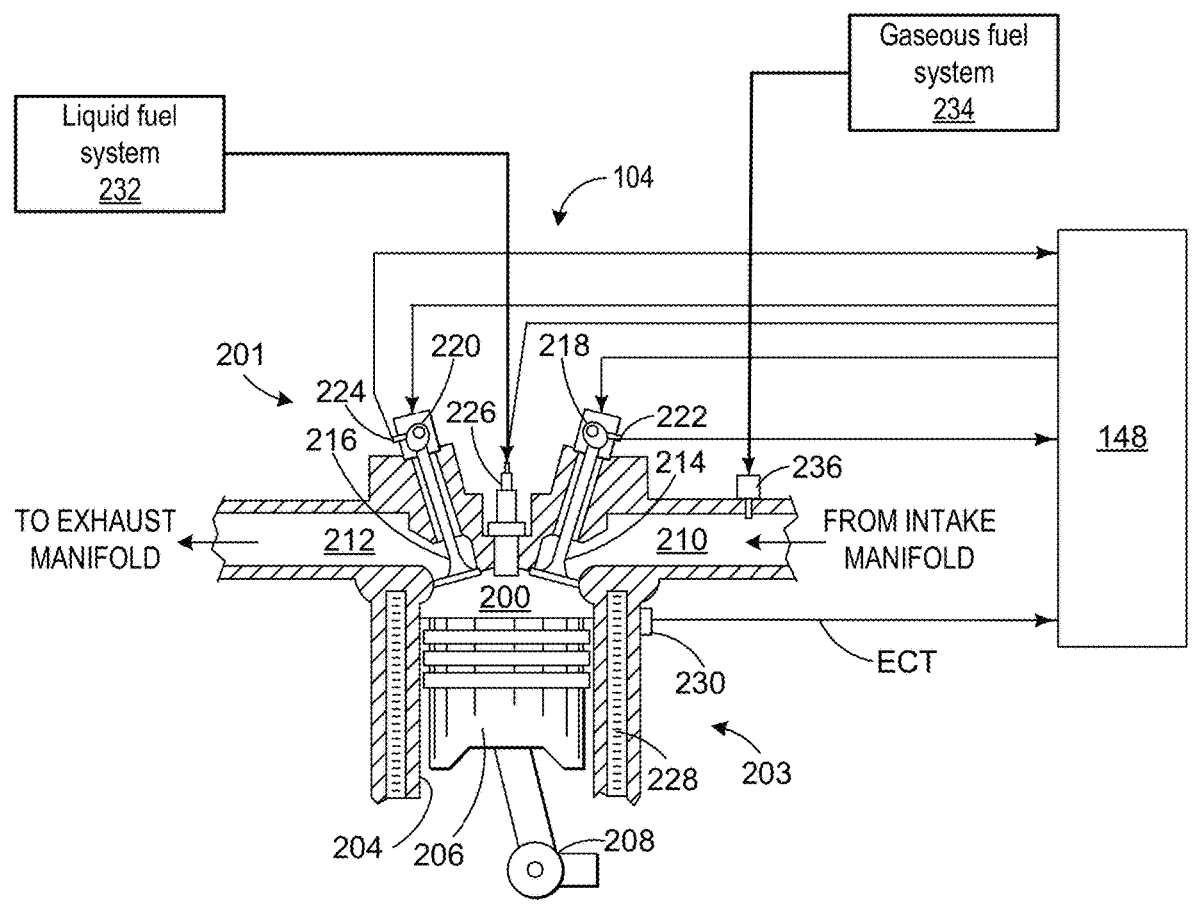
FIG. 2 shows a schematic diagram of an example cylinder of a multi-fuel engine according to an embodiment of the invention.

An example rail vehicle including a multi-fuel engine is shown in FIG. 1. An example cylinder of the engine of FIG. 1 is shown in FIG. 2. The vehicle of FIG. 1 may include an engine controller that can command the engine to operate at a commanded engine speed, according to the engine speed regulation illustrated in FIG. 3. The engine speed regulation includes an output of commanded gross indicated torque, which is split to form commanded gaseous fuel amounts and commanded liquid fuel amounts according to estimated gaseous fuel torque and estimated liquid fuel torque. As shown in FIG. 4, gaseous fuel torque errors may result in an error in the commanded torque output. The gaseous fuel torque may thus be estimated and corrected for according to the method shown in FIG. 5, which includes execution of a gas accuracy test. A first example of the gas accuracy test is shown by the method of FIG. 6, where an override of the commanded substitution ratio in the form of a periodic signal is applied and the resultant gross torque output of the engine speed regulation is analyzed to determine a gas error correction factor. The gas error correction factor may then be used in the determination of the gaseous fuel torque for generating gaseous fuel amounts, as shown by the control diagram of FIG. 10.

Figure 7:
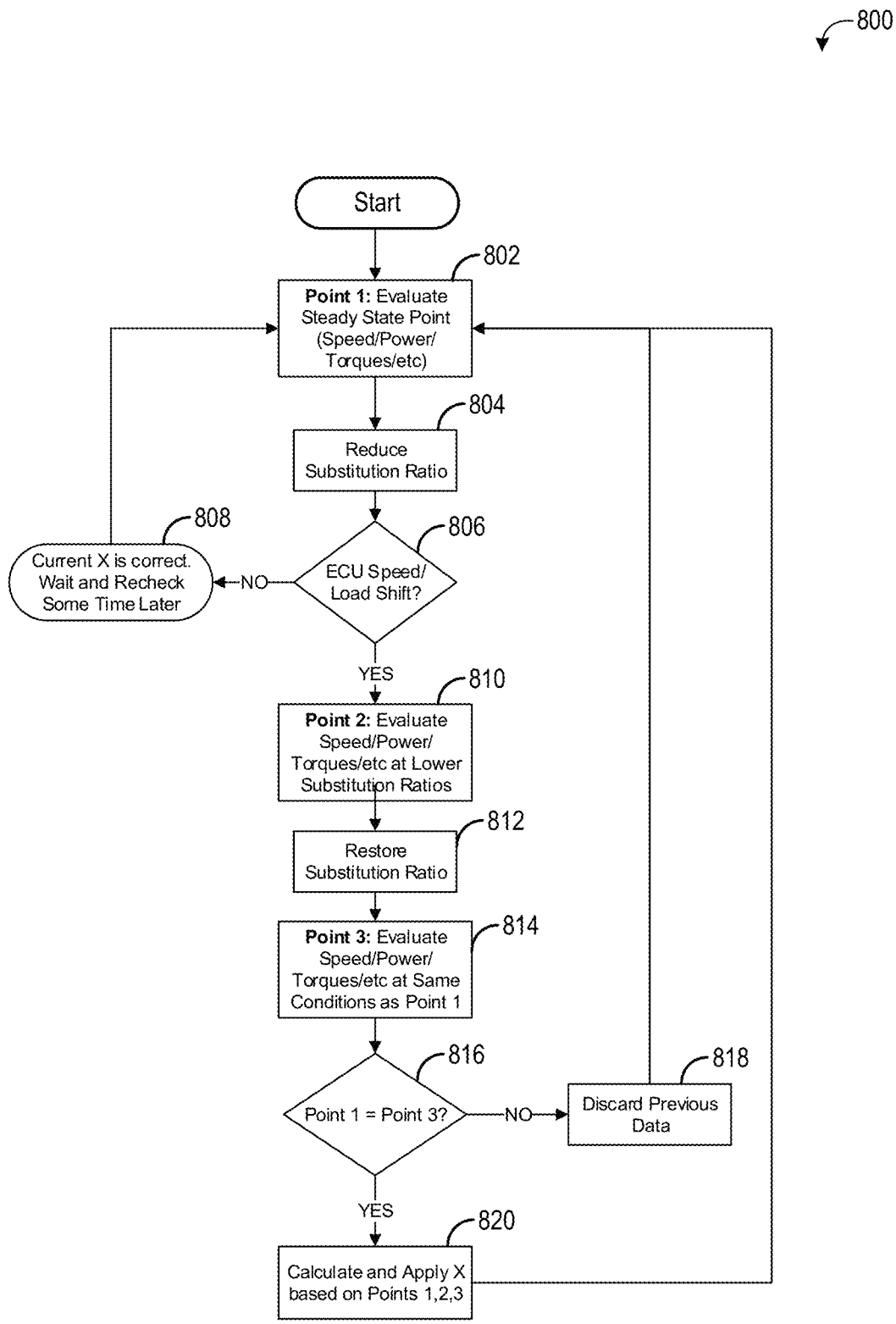
FIG. 7 is a flow chart illustrating a second example method for a fuel accuracy test.
Figure 8:
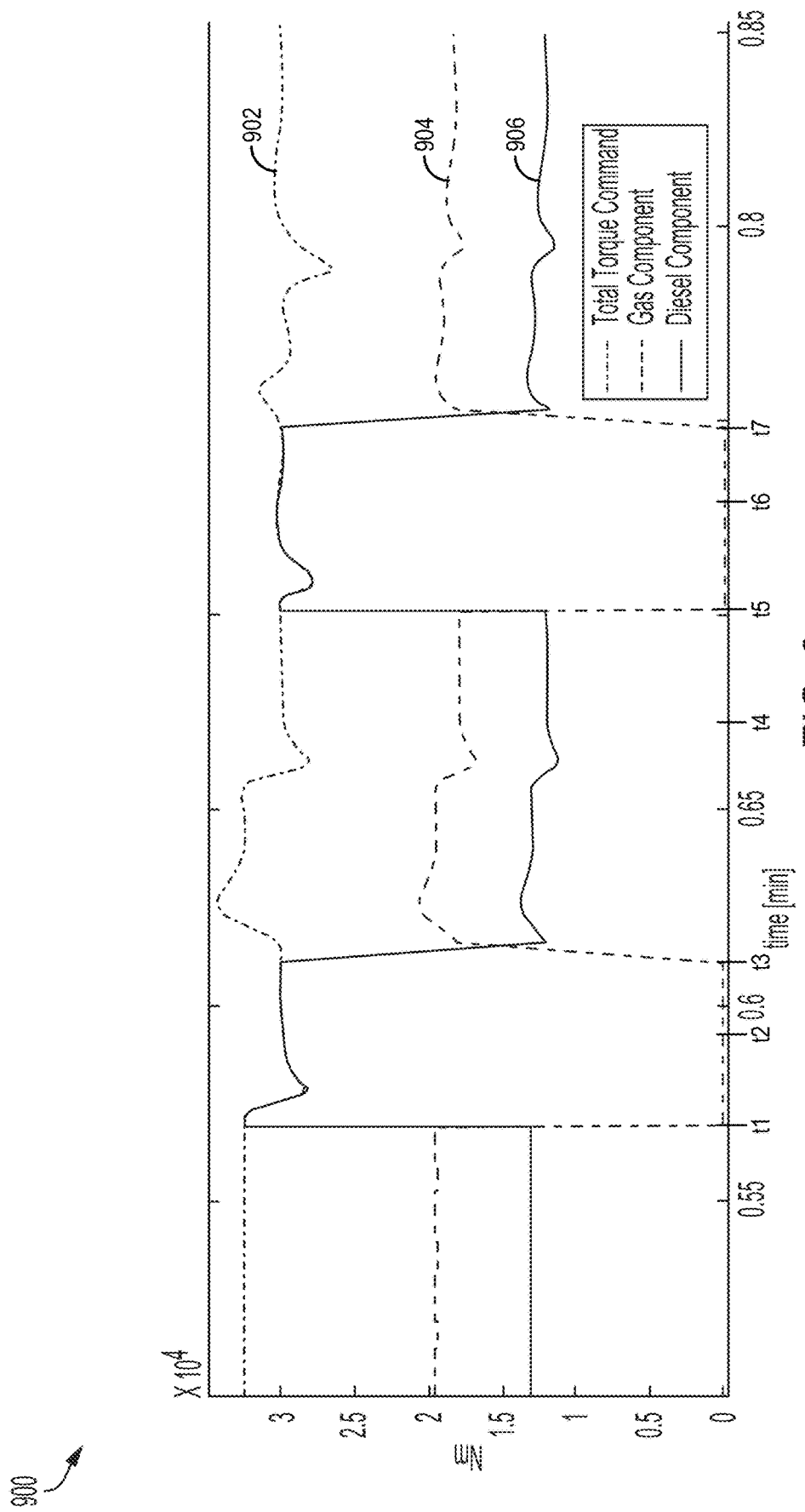
FIG. 8 is a graph illustrating total torque, gaseous fuel derived torque, and liquid fuel derived torque before, during, and after execution of the method of FIG. 7.
Figure 9:
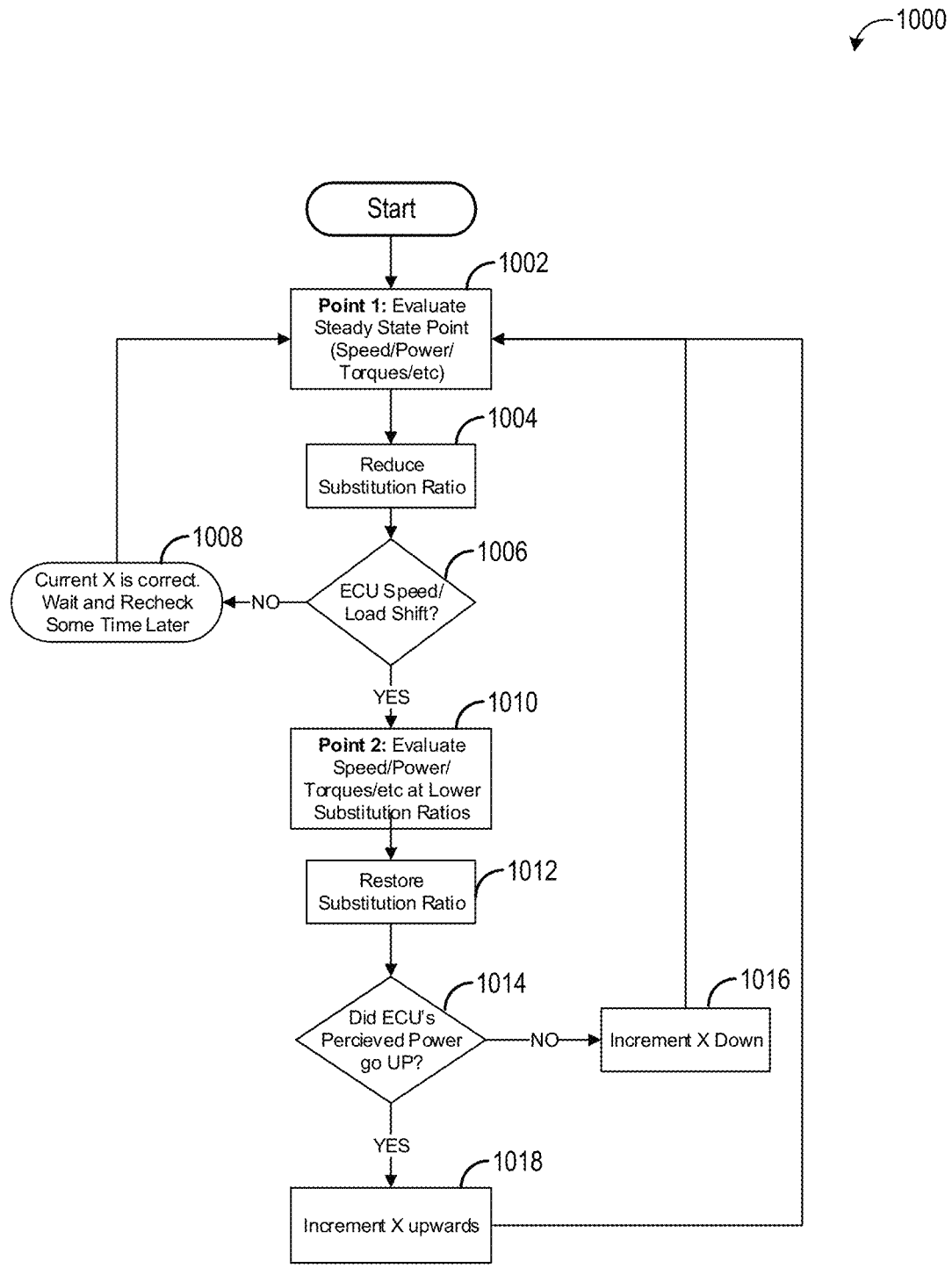
FIG. 9 is a flow chart illustrating a third example method for a fuel accuracy test.

A second example of the gas accuracy test is shown by the method of FIG. 7, where the substitution ratio override is a discrete, single override and the gas error correction factor is directly measured upon the override event. A graph showing overrides of the substitution ratio and resultant correction of the gaseous fuel torque estimation according to the method of FIG. 7 is shown in FIG. 8. A third example of the gas accuracy test is shown by the method of FIG. 9, where the substitution ratio override includes a series of discrete override events and the gas error correction value is incrementally adjusted upon each override event.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Stationary or semi-mobile platforms may include power generation systems, for example. Mobile platforms include self-propelled vehicles. Such vehicles can include on-road transportation vehicles, as well as mining equipment, marine vessels, agricultural vessels, buses, tractor trailers, automobiles, aircraft, rail vehicles, and other vehicles for on highway and off-highway (OHV). For clarity of illustration, a locomotive is provided as an example of a mobile platform supporting a system incorporating an embodiment of the invention.

Before further discussion of the approach for calculating a gas error correction factor to compensate for gaseous fuel energy content variation and gas admission valve flow coefficient variation, an example of a platform is disclosed in which the engine may be installed in a vehicle, such as a rail vehicle. FIG. 1 shows a block diagram of an embodiment of a vehicle system 100 (a rail vehicle or locomotive system in the illustrated embodiment), herein depicted as vehicle 106. The illustrated vehicle is a rail vehicle that can run on a route 102 (in this example, the route is a rail set) via a plurality of wheels 112. As depicted, the vehicle includes an engine system with an engine 104. In one embodiment herein, the engine is a multi-fuel engine operating with diesel fuel and natural gas, but in other examples the engine may use various combinations of fuels other than diesel and natural gas.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system can include a turbocharger 120 ("TURBO") (or supercharger) that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In other embodiments, the engine system may not include a turbocharger.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller (e.g., electronic controller) 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, boost pressure, exhaust pressure, ambient pressure, exhaust temperature, and the like. Correspondingly, the controller may control aspects and operations of the vehicle system by sending commands to various components such as the liquid fuel injectors, gas admission valves, and the like.

As shown in FIG. 1, the engine includes a plurality of cylinders 108. Though FIG. 1 depicts an engine with 8 cylinders, other numbers of cylinders are possible (such as twelve, including six cylinders on each bank of the engine). Additional details about the cylinders of the engine are presented in more detail below with respect to FIG. 2. The engine 104 drives an alternator 160. The output of the alternator 160 is converted into DC via a rectifier bank 162. The DC power is provided over a DC bus 165 to an inverter unit 164. The inverter unit 164 includes DC-to-AC conversion circuitry of a known type, and also employs components such as Insulated Gate Bipolar Transistors (IGBTs) or thyristors operating as pulse width modulators (not shown) to provide a AC power to a motor 166 which is coupled to a wheel (such as wheel 112) through a known type of reduction gear (not separately shown). For the sake of illustrative simplicity, only one inverter unit and motor are shown, but the vehicle may be provided with multiple motors driven by multiple inverter units. In the illustrated embodiment, the motor is a traction motor.

While an AC-DC-AC system is described herein, the principles of the disclosure apply to other drivetrain configurations, e.g. using an alternator or DC generator as a power source and/or using AC or DC traction motors. Furthermore, the principles of the disclosure also apply to other types of vehicles, such as rail vehicles or road vehicles. The vehicle may use any type of element adapted to exert a tractive force. Examples of tractive elements include wheels, axles, or translating or reciprocating structures. The term "traction motor" could encompass, for example, electric or hydraulic linear motors.

One or more chains of grid resistors 168 are connected across the DC bus 165. The grid resistors 168 may be selectively coupled to the DC bus 165 to dissipate power generated by the traction motor 166 and thereby provide dynamic braking. This is referred to as a "retard" function. Other electrical energy absorbing devices may be used in place of the grid resistors 168 to dissipate and/or use the power generated, for example batteries, a regenerative system, or equipment to use the power like auxiliary systems and accessories.

In some examples, a second control unit separate from the engine controller 148 may regulate load placed on the engine by the alternator. The engine controller 148 may regulate fueling of the engine by sending a signal to adjust an opening degree and/or duration of one or more fuel injectors of the engine (e.g., the signal may cause a solenoid in the fuel injector to be energized for a given duration to open the fuel injector) and/or one or more gas admission valves of the engine. The second control unit may regulate load placed on the engine by adjusting the electrical load on the alternator, which is proportional to the load placed on the engine by the alternator. To adjust the electrical load on the alternator, the second control unit may selectively couple the alternator to the resistive grids, increase output of the motors, etc. Further, in other vehicle configurations (e.g., marine applications), the load placed on the engine may be a load from a motor that drives a propeller or other auxiliary device.

FIG. 2 depicts an embodiment of a combustion chamber, or cylinder 200, of a multi-cylinder internal combustion engine, such as the engine described above with reference to FIG. 1. For example, the cylinder may be any one of the cylinders 108 shown in FIG. 1. The cylinder may be defined by a cylinder head 201, housing the intake and exhaust valves and liquid fuel injector, described below, and a cylinder block 203.

The engine may be controlled at least partially by a control system including engine controller 148 which may be in further communication with a vehicle system. As described above, the controller may further receive signals from various engine sensors including, but not limited to, engine speed, boost pressure, exhaust pressure, turbocharger speed, ambient pressure, $CO_2$ levels, exhaust temperature, NOx emission, engine coolant temperature (ECT) from temperature sensor 230 coupled to cooling sleeve 228, knock sensor data, etc. Correspondingly, the controller may control the vehicle system by sending commands to various components such as cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated through a connecting rod into rotational motion of the crankshaft. The crankshaft may include a crankshaft speed sensor for outputting a speed (e.g., instantaneous speed) of the crankshaft. Thus, a crankshaft speed sensor is one non-limiting example of the one or more sensors 150 of FIG. 1. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based at least in part on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, liquid fueling to the cylinder may be controlled by the controller actuating the fuel injector based at least in part on commanded engine speed, measured engine speed, and estimated liquid fuel torque.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, opening time (in engine crank position or in engine crank degree) and/or duration of opening of the gas admission valve may be adjusted to regulate an amount of gaseous fuel provided to the cylinder. Adjusting the opening timing (e.g., when the gas admission valve is opened and closed) may be referred to herein as adjusting induction timing of gaseous fuel. As one example, the duration of gas admission (or gas valve) opening is defined by the engine crank degrees corresponding to opening and closing of the gas admission valve. As explained further below, gaseous fueling to the cylinder may be controlled by the controller actuating the gas admission valve based at least in part on commanded engine speed, measured engine speed, and estimated gaseous fuel torque.

Each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve position may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc. In yet another embodiment, gaseous fuel from the gaseous fuel system may be directly injected into the engine cylinders. For example, each cylinder may include a direct fuel injector or gas admission valve (similar to valve 236) coupled directly to an engine cylinder. In this way, both diesel and gaseous fuel may be directly injected into individual engine cylinders (e.g., such as in a high pressure "dual-fuel" direct injection system). Additionally, in one embodiment, each engine cylinder may include a spark plug for igniting fuel, such as natural gas, at the engine cylinder. In another embodiment, each engine cylinder may include an alternate ignition device (other than a spark plug) for igniting fuel at the engine cylinder, such as a laser or an alternate ignition source.

Figure 3:
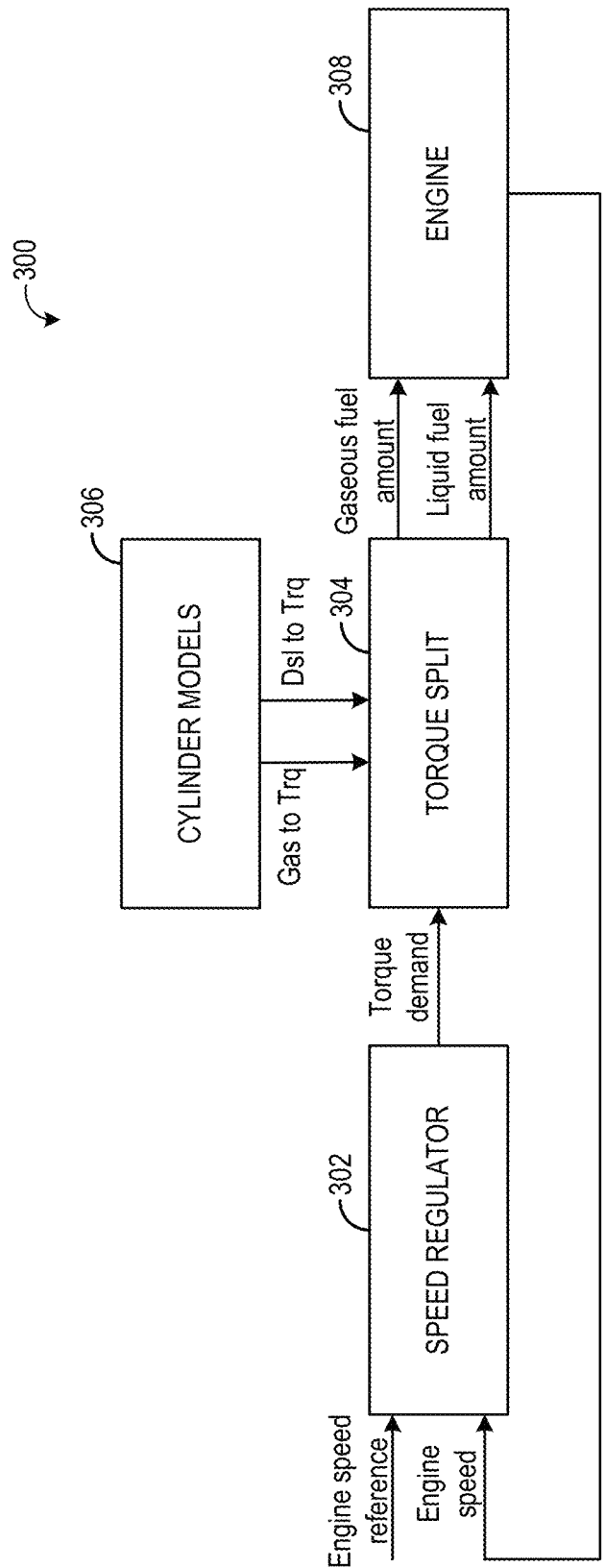
FIG. 3 is a control diagram showing an example engine speed regulation.
Figure 4:
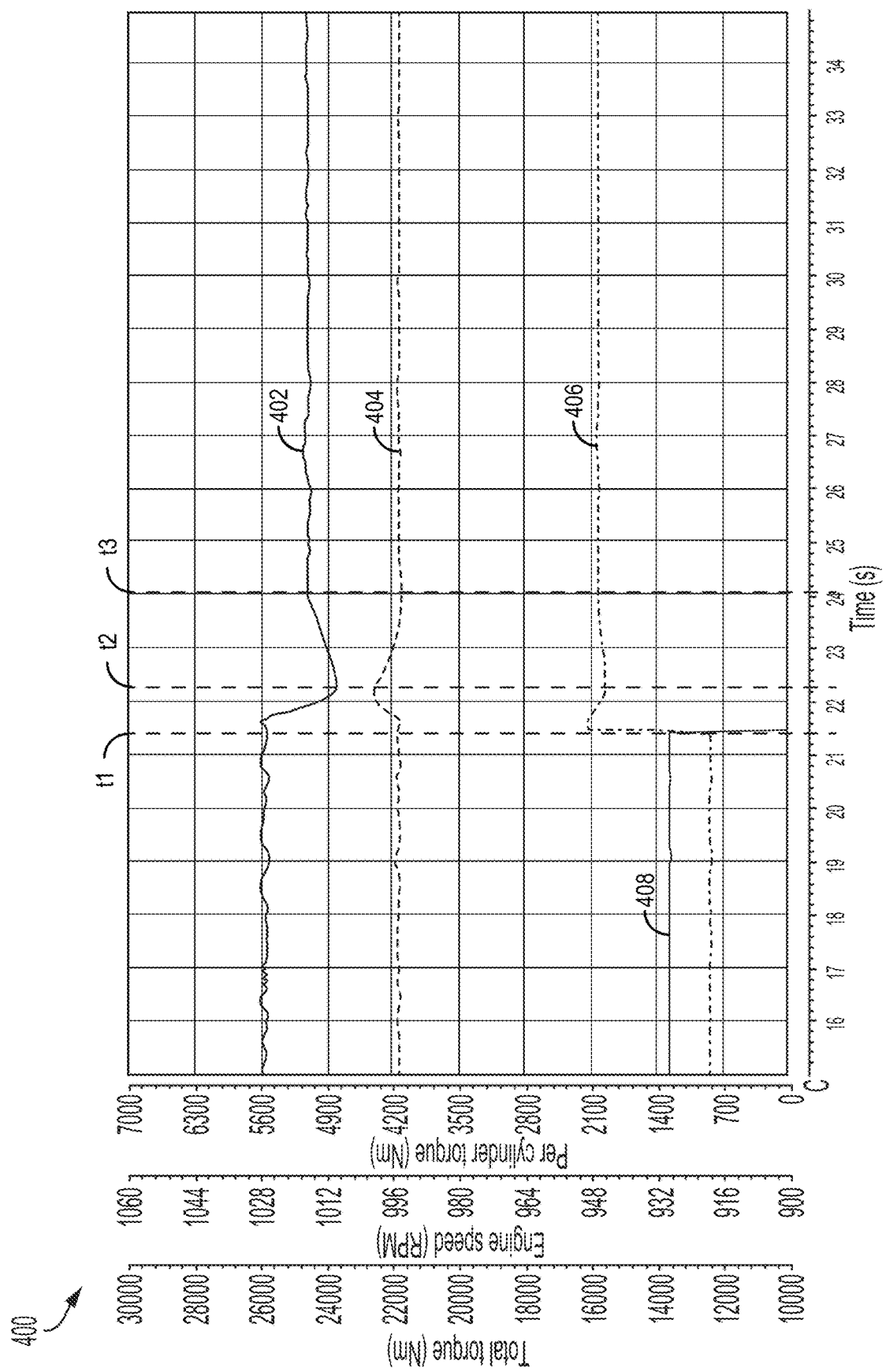
FIG. 4 is a graph illustrating a torque shift in response to a change in fuel substitution ratio.

FIG. 3 is an example control diagram 300 of an engine speed regulation that may be implemented at least partially as instructions stored in engine controller 148 in order to generate fueling commands for controlling the injection of liquid fuel and/or admission of gaseous fuel to the engine. The engine speed regulation includes a speed regulator 302. Speed regulator 302 may be a suitable regulator, such as a proportional integral regulator. Speed regulator 302 outputs a torque demand, herein referred to as a total gross indicated torque, although other types of torque demands are possible (such as brake torque). The torque demand is output from the regulator based at least in part on an engine speed reference and measured engine speed. For example, the difference between the reference speed and the measured speed may be a speed error that the regulator uses to generate the torque demand. The speed reference may be based at least in part on operator input, such as selected notch throttle setting, or other suitable input. The measured speed may be determined from output from the one or more crankshaft speed sensors.

The total gross indicated torque is input into a torque split algorithm 304. The torque split algorithm 304 determines how much fuel to supply to the engine in order to meet the demanded total gross indicated torque. The torque split algorithm 304 receives conversion factors for converting a fuel amount to estimated torque that will be generated by the engine when that fuel amount is combusted. The conversion factors are supplied by cylinder models 306, and include a gaseous fuel to torque (Gas to Trq) conversion factor (also referred to as a gaseous torque estimate) and a liquid fuel to torque (Dsl to Trq) conversion factor (also referred to as a liquid torque estimate). The torque split algorithm 304 uses the conversion factors as well as commanded substitution ratio to determine how much of each of the gaseous fuel and liquid fuel to supply to the engine to meet the torque demand. For example, if the gross indicated torque is 25,000 Nm and the substitution ratio is 0 (e.g., no gaseous fuel), the torque split algorithm 304 may determine that the per-cylinder torque to be generated by the liquid fuel is 2,083.33 Nm/cyl (assuming a 12-cylinder engine). If the substitution ratio is 60%, such that 60% of the torque is to be generated by combustion of the gaseous fuel, the torque split algorithm 304 may determine that the per-cylinder torque to be generated by the gaseous fuel is 1250 Nm/cyl and the per-cylinder torque to be generated by the liquid fuel is 833.33 Nm/cyl. Using the per-cylinder torque determinations and the torque conversion factors for each of the types of fuel, respective fuel amounts may be determined. For example, the torque split algorithm 304 may utilize a gas admission valve map (GAV map) and a liquid fuel injector map (injector map) along with the per-cylinder torque determinations and torque conversion factors to determine fuel amounts that may be supplied to the valve/injector firmware, which then commands the actual open/injection duration for each valve/injector of the engine 308.

Each torque conversion factor/torque estimation may be based at least in part on the energy content of the respective fuel and the quantity of fuel supplied to the cylinder. When the torque split algorithm determines the torque amount for each fuel type, the quantity of fuel to be supplied to the engine may be determined and then converted into a fuel injection duration or gas admission valve open duration. The gaseous fuel torque (Tgas) may be determined according to the following equation (for a 12 cylinder engine):

$$T_{gas} = \frac{G * LHV_{gas} * \eta_{gas} * 12}{4\pi} \qquad \text{Eq. 1}$$

Where G is the amount of gaseous fuel supplied per cylinder in each engine cycle, $LHV_{gas}$ is the lower heating value of the gaseous fuel, and $\eta_{gas}$ is fuel conversion efficiency. As explained above, the speed regulator may output a gross indicated torque demand (e.g., 25,000 Nm) to the torque split algorithm, and the torque split algorithm may determine how much of that gross indicated torque is to be generated by the gaseous fuel and how much is to be generated by the liquid fuel, according to the commanded substitution ratio. The torque that is to be generated by the gaseous fuel (e.g., 1250 Nm/cyl for a 60% substitution ratio) may be entered into the above equation to solve for the gaseous fuel amount, for example.

The liquid torque (e.g., diesel torque, Tdsl) may be determined according to the following equation:

$$T_{dsl} = \frac{F * LHV_{dsl} * \eta_{dsl} * 12}{4\pi} \qquad \text{Eq. 2}$$

Where F is the amount of liquid fuel supplied per cylinder in each engine cycle, $LHV_{dsl}$ is the lower heating value of the liquid fuel and $\eta_{dsl}$ is fuel conversion efficiency. The torque that is to be generated by the liquid fuel (e.g., 833.33 Nm/cyl) may be entered into Eq. 2 to solve for the liquid fuel amount, for example.

As described above, gaseous fuel energy content may vary from source to source, due to processing variations, and/or due to stratification in the fuel tank over time. Additionally, gas admission valve fuel metering may vary from batch to batch and/or part to part and in general may not be as accurate as liquid fuel injectors in delivering commanded fuel amounts. Thus, given that the gas torque determination relies on both the energy content of the gaseous fuel (e.g., the lower heating value) and the metered amount of gaseous fuel, if either (or both) of these parameters changes or is not estimated accurately, the actual torque generated by the engine may deviate from the demanded torque. As appreciated by FIG. 3, if the gaseous and liquid fuel amounts determined by the torque split algorithm 304 are not sufficient for the engine to actually generate the gross indicated torque (or if the fuel amounts are in excess of what is needed for the engine to actually generate the gross indicated torque), engine speed may deviate from the reference speed, causing the speed regulator to increase (or decrease) the demanded gross indicated torque. Using the example presented above, if the demanded gross indicated torque of 25,000 Nm is not met and engine speed decreases due to lower engine torque actually being generated (e.g., a torque of only 24,000 Nm is generated), the speed regulator will increase the demanded torque (e.g., to 26,000 Nm) in order to command a sufficient amount of fuel be supplied to the engine for the engine to maintain the commanded engine speed.

When the speed regulator compensates for errors in the estimation of the gaseous fuel torque, the adjustment to the total demanded torque results in an eventual adjustment of the amount of fuel supplied to the engine. This fuel adjustment is applied equally to both the gaseous fuel and the liquid fuel, even though the error may be mostly or solely due to the gaseous fuel. As such, more liquid fuel than commanded or required may be injected, limiting the benefits of the gaseous fuel and potentially compromising emissions. The shift in the controller's torque demand is also a shift in the controller's calculated power estimate (as power is a function of speed and torque). As such, in addition to causing a shift in substitution ratio, these inaccuracies can cause the controller to inaccurately estimate power, which may lead to an incorrect liquid fuel injection timing and/or rail pressure target, as well as emissions issues. Thus, according to embodiments disclosed herein, the error in the estimation of the gaseous fuel torque may be learned, in real time as the engine is operating, and compensated for in the engine speed regulation. By doing so, accurate amounts of both the liquid and gaseous fuels may be supplied to the engine to reach the demanded torque, even if properties of the gaseous fuel change (e.g., a refueling event occurs or a switch between gaseous fuel tanks occurs, thereby causing gaseous fuel with a different energy content to be used).

To estimate and correct for the error in the gaseous fuel torque estimation, a correction factor may be calculated that can be used to scale the gaseous fuel torque estimation. The correction factor is determined by estimating gaseous fuel torque and liquid fuel torque at two different steady state points where the amount of gaseous and/or liquid fuel supplied to the engine is different (e.g., different substitution ratios), but engine speed, torque loss, and brake torque are the same. Brake torque (where J is rotational inertia and ω is engine acceleration) may be calculated according to the following equation:

$$T_{Loss} + T_{gas} + T_{dsl} + T_{load} = J\dot{\omega}$$ Eq. 3

When engine speed, torque loss, and brake torque do not change across the two operating points, the equations for the brake torque at the two operating points, 1 and 2, may be set equal to each other and simplified to:

$$T_{gas1} + T_{dsl1} = T_{gas2} + T_{dsl2}$$ Eq. 4

The gaseous fuel torque model inaccuracies will force the engine speed regulation to report different gross indicated torque demands. The correction factor is then calculated to scale the controller's gas torque knowledge, X, such that the controller's knowledge of the above equation is true:

$$X^*T_{gas1} + T_{dsl1} = X^*T_{gas2} + T_{dsl2}$$ Eq. 5

Solving for X yields:

$$\left(\frac{T_{dsl1} - T_{dsl2}}{T_{gas2} - T_{gas1}}\right)_{ECU} = X$$ Eq. 6

For this operating speed/load, the engine controller's knowledge of the power generation at each point becomes equivalent. As long as the liquid fuel torque knowledge is accurate, the gaseous fuel torque knowledge will be as well. Assuming the liquid fuel accuracy is comparable between the two points, the correcting term for the controller's gaseous torque estimation is determined, at this particular operating condition. In some examples, the torque losses may be calculated and included in the calculation of the correction factor, rather than assuming the torque losses are the same across the two operating points.

The above calculation assumes two discrete operating points, and further assumes that liquid fuel torque and torque loss are known to a sufficient degree of accuracy, engine acceleration is zero, and inertia and load torque are constant. Accordingly, engine speed and load may remain the same, but other factors may move around. Taking this into account, the system may be perturbed (e.g., the substitution ratio may be perturbed) periodically at a frequency, f, and the resultant amplitudes, A, may be measured, resulting in the following equation for calculating the correction factor:

$$\left(\frac{A_{dsl} - A_{Loss}}{A_{gas}}\right)_{At\ f} = X$$ Eq. 7

This equation relies on the assumption that torque loss is in-phase with diesel torque. Torque loss is a function of PMEP (speed, MAP, airflow), the fuel pump induced FMEP (diesel flow, rail pressure), and engine FMEP (speed, oil temperature). Of these parameters, speed/power are constant, rail pressure is controlled such that it is constant or higher in diesel only, and oil temperature is relatively slow moving, so the primary differences will be due to fuel flow changes, which is positively correlated (or flat) with increasing fuel flow. In some examples (e.g., depending on the sign of the torque loss amplitude), the torque loss amplitude may be added to the diesel torque amplitude.

As described above, the gas torque equation (Eq. 1) relies on a determination of gas quantity and lower heating value, each of which may be prone to error. For example, the gas quantity (e.g., gaseous fuel amount to be supplied to each cylinder per engine cycle) may be converted to a gas admission valve open duration, based at least in part on the knowledge of each gas admission valve's gas flow coefficient, which may vary from valve to valve. The LHV is a fuel property dependent of the operator-controller gas supply. Thus, the correction factor described above may be valid across all operating points since both of these sources of variation are multipliers to the gas torque term, and independent of operating point. However, should there be an operating point dependent source of variation in gas admission valve flow, the correction factor could be calibrated at various operating points.

FIG. 4 is a graph 400 illustrating engine torque demand, engine speed, and fuel-specific cylinder torque during a change in substitution ratio, to illustrate the torque error that results from inaccurate estimation of the gaseous fuel torque. Graph 400 includes a total demanded torque curve (curve 402), which may be the total gross indicated torque output by the speed regulator 302. Graph 400 further includes an engine speed curve (curve 404), a per-cylinder liquid fuel torque curve (curve 406), and a per-cylinder gaseous fuel torque curve (curve 408), each of which is plotted as a function of time. Prior to time t1 (where time t1 is shown as being between 21 and 22 seconds), total torque is relatively constant, with an average of approximately 26,000 Nm, engine speed is held around 995 RPM, liquid fuel per-cylinder torque is approximately 900 Nm/cyl, and gaseous fuel per-cylinder torque is approximately 1300 Nm/cyl, resulting in a substitution ratio of approximately 60%. At time t1, the substitution ratio is dropped to 0%, causing gaseous fuel per-cylinder torque to drop to zero. As appreciated at time t2 (e.g., just after 22 seconds), the shift in substitution ratio introduces a disturbance to the system via a change in fueling accuracy, causing engine speed to increase. The torque demand decreases in response to the increase in engine speed. The speed regulator eventually compensates for the drop in torque to bring the engine speed back to the reference speed (e.g., 995 RPM) by time t3 (e.g., around 24 seconds), and the liquid fuel per-cylinder torque is approximately 2000 Nm/cyl at time t3.

This drop in the engine controller's torque demand upon change in substitution ratio is not due to a change in loading on the engine, as the engine load is held steady during the time plotted in FIG. 4. Rather, the torque drop is due to a previous overestimation of the engine torque which caused the speed regulator to demand a higher total torque than the torque actually being generated by the engine. For example, prior to time t1, the total torque was around 26,000 Nm, while after the drop in substitution ratio, the total torque average is approximately 24,500 Nm. This resulted in a drop of gross indicated power of around 315 HP. Because the substitution ratio was dropped to zero and the fuel torque knowledge is better known, the error may be attributed to the overestimation in the gas torque calculation, and the torque error is proportional to the error in the gas torque calculation. Applying the equation for the calculation of the correction factor described above (Eq. 6) results in the following example correction factor:

$$\left(\frac{T_{dsl1} - T_{dsl2}}{T_{gas2} - T_{gas1}}\right)_{ECU} = \frac{900 - 2000}{0 - 1300} = \frac{-1100}{-1300} = 0.85$$

Once operation with gaseous fuel resumes, this correction factor may be applied to the calculation of the gas torque, resulting in a more consistent total torque estimate relative to the period of single fuel operation.

Figure 5:
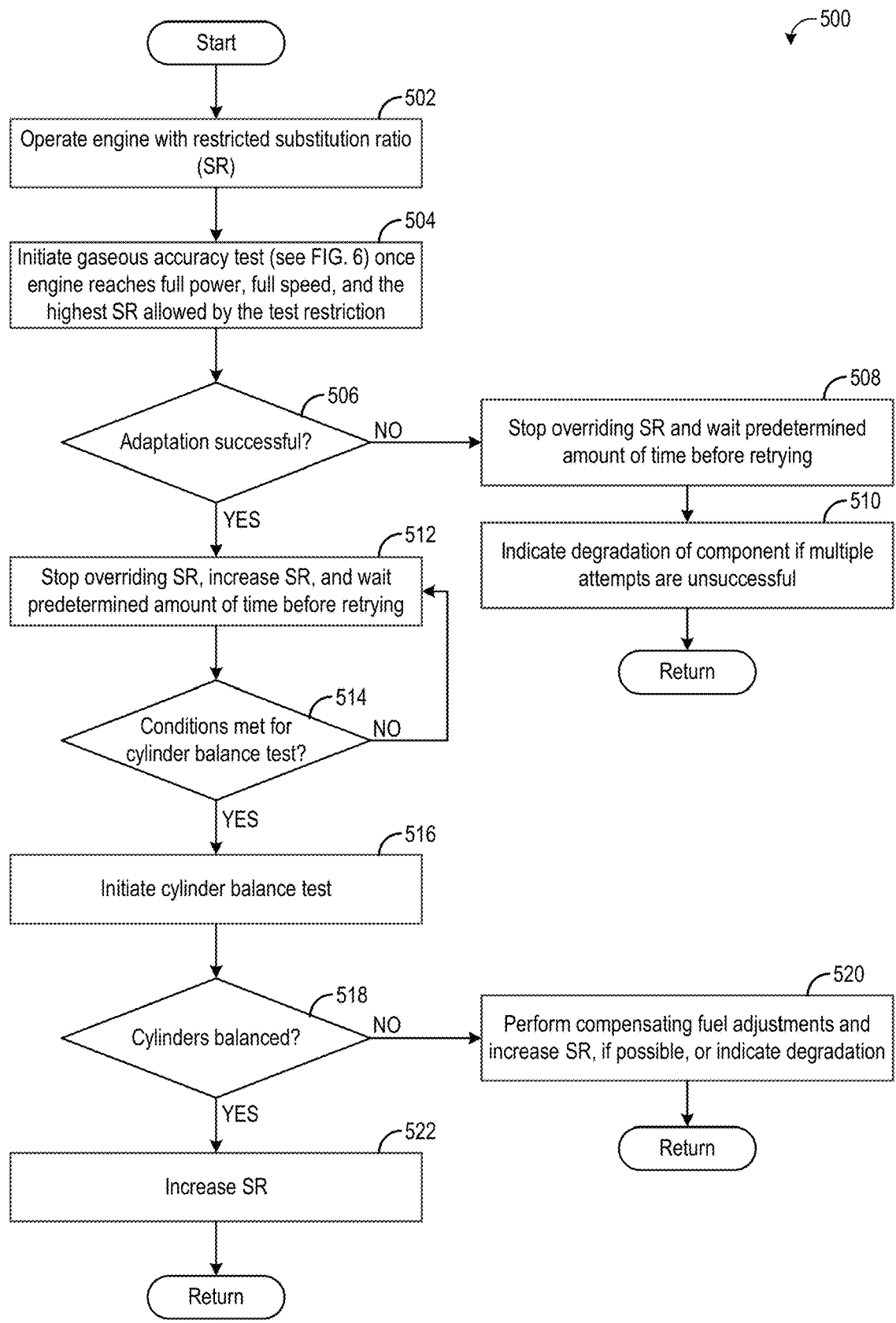
FIG. 5 is a flow chart illustrating an example method for correcting for fuel power estimation errors.
Figure 6:
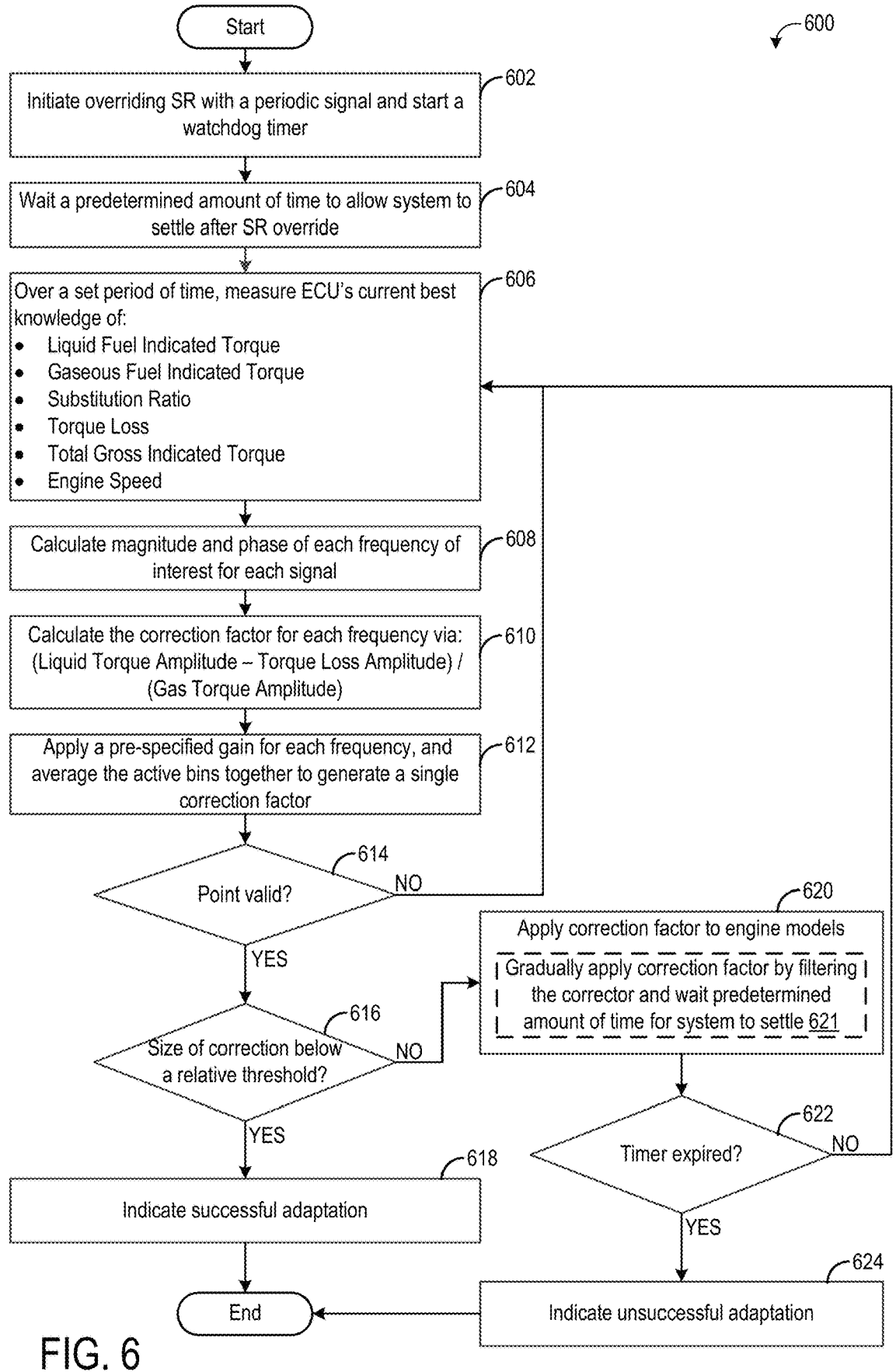
FIG. 6 is a flow chart illustrating a first example method for a fuel accuracy test.

Turning now to FIG. 5, a method 500 is shown for determining and correcting error in an engine torque determination used to control fuel amounts in a multi-fuel engine of a vehicle. In some examples, the vehicle can convert engine output to electricity in order to power one or more loads, such as traction motors, propellers, etc. Method 500 estimates the relative error between the gaseous torque estimation and liquid fuel estimation to provide a gas correction factor which minimizes this error. The relative error may be estimated by varying the substitution ratio at steady state conditions and evaluating the disturbance on the engine speed regulation, as explained in more detail below with respect to the methods of FIGS. 6, 8, and 10. Briefly, when substitution ratios are varied, the engine speed regulation (e.g., executed by the engine controller) will compensate for any inaccuracies to maintain speed. By measuring and correcting for this disturbance, the controller's inaccurate estimation of the gas energy may be corrected using its relatively accurate knowledge of the liquid fuel injection energy.

Instructions for carrying out method 500 and the rest of the methods included herein may be executed by a controller (e.g., controller 148 shown in FIGS. 1-2) based on instructions stored on a memory of the controller and in conjunction with signals received from sensors of the engine system, such as the sensors described above with reference to FIGS. 1 and/or 2. The controller may employ engine actuators of the engine system to adjust engine operation, according to the methods described below.

At 502, method 500 includes operating the engine with a restricted substitution ratio (SR). As explained above with respect to FIG. 2, the engine may be supplied both gaseous fuel (e.g., natural gas) and liquid fuel (e.g., diesel fuel) at a given substitution ratio, where the substitution ratio represents the proportion of total engine torque generated by the gaseous fuel. Typically, the substitution ratio is determined based on engine operating parameters, such as engine load, notch throttle setting, engine speed, engine knock, and/or other parameters, and may be set to the highest possible substitution ratio the operating parameters will allow. However, during the gas accuracy routine described below, the substitution ratio may be restricted to a predetermined substitution ratio, such as 60%. For example, if the engine is operating with operating parameters where an 80% substitution ratio would be permissible, the substitution ratio may be restricted to be at or under 60% during the course of the test. In this way, error that may be associated with high substitution ratios (e.g., at very high substitution ratios, the liquid fuel injectors may enter the ballistic region, where the small amounts of fuel injected by the liquid fuel injectors may be less accurately metered than higher amounts of fuel) may be avoided, thereby isolating the error to the determination of the gas torque. The SR may be restricted until the routine is successfully performed after initial controller boot up.

At 504, method 500 includes initiating the gas accuracy test once the engine reaches full power, full speed, and the highest SR allowed by the test restriction. The gas accuracy test, which will be explained in more detail below, may be the most accurate when the test is executed at full engine power (e.g., when the throttle is set to the highest setting, such as a notched throttle being set to notch 8) and the engine speed associated with that full power. For example, the gaseous torque estimation determined during the gas accuracy test may be most beneficial when applied at full power and the errors corrected by the gaseous torque estimation are proportional to power, with the higher the power, the larger the error. As such, the gas accuracy test may be performed at full power. Further, to ensure a robust test with the greatest possible SR disturbance, the test may be initiated when the SR is at the highest SR allowed by the restriction (e.g., 60%). Additional details regarding the gas accuracy test will be described in more detail below with respect to FIGS. 6, 8 and 10. Briefly, the gas accuracy test introduces a disturbance to the SR, such as periodically lowering the substitution ratio, and then measures the engine speed regulation response to the change in SR. If the engine speed regulation continues to output the same demanded torque, regardless of SR, the gas accuracy test may conclude that the gas torque estimation is accurate and no further correction is applied. If the engine speed regulation outputs a different demanded torque upon the change in SR, a correction factor is determined and then applied to the gas torque estimation, until the engine speed regulation is able to output the same (or relatively same) demanded torque regardless of SR.

At 506, method 500 determines if the adaptation resulting from the gas accuracy test is successful. The adaptation may be deemed successful if, after a predetermined number of attempts at adapting the gas torque estimation, the demanded torque changes by less than a threshold upon a change in the SR. The adaptation may be deemed unsuccessful if, after the predetermined number of attempts at adapting the gas torque estimation, the demanded torque changes by more than the threshold upon a change in the SR. If, at 506, it is determined that the adaptation was not successful, method 500 proceeds to 508 to stop the overriding SR and wait a predetermined amount of time before retrying the gas accuracy test. The overriding SR may be the change in the SR applied during the gas accuracy test, and thus stopping the overriding SR may include resuming the SR commanded for the given operating conditions. The gas accuracy test may be retried after a predetermined amount of time, such as five minutes. In some examples, the gas accuracy test may be unsuccessful due to changes in engine load or other operating parameters during the test that may confound the test results. Thus, by waiting a predetermined amount of time and repeating the test, the operating parameters may have changed, allowing the test to be carried out again.

In some examples, method 500 optionally includes, at 510, indicating degradation of one or more system components if multiple attempts at adaptation are unsuccessful. For example, if multiple attempts at adaptation are not successful in lowering the error in the torque demand, the error may be due to degraded components, such as one or more degraded gas admission valves, rather than error in the gas torque determination. If the correction factor that is calculated during the gas accuracy test is low (e.g., lower than a first threshold, such as 0.5), it may indicate that one or more gas admission valves are leaky or stuck open, resulting in excess gaseous fuel being admitted to the engine. If the correction factor is relatively high (e.g., higher than a second threshold, such as 1.5), it may indicate poor quality gaseous fuel or a stuck closed gas admission valve, resulting in less gaseous fuel than commanded being supplied to the engine, or gaseous fuel that is unable to generate an expected energy during combustion. If degradation is indicated, an operator may be notified and/or a diagnostic code may be stored in memory of the controller. Method 500 then returns.

Returning to 506, if the adaptation was successful, method 500 proceeds to 512 to stop the overriding SR, increase the SR if allowed, and wait a predetermined amount of time before executing the test again. The overriding SR may be the change in SR commanded during the gas accuracy test, and thus stopping the overriding SR may include commanding a SR based on engine conditions. Further, the adaptation to the gas torque estimation may reduce error in the gas torque estimation, thereby allowing the substitution ratio to be increased to a ratio higher than the SR used before the gas accuracy test was initiated. For example, due to the error in the gas torque estimation, the SR may have been limited to a maximum of 80% prior to adaptation of the gas torque determination. Once the gas accuracy test is carried out, if the gas torque estimation was corrected, the lowered error in the gas torque estimation may enable the maximum SR to be increased, e.g., to 85%. Thus, after adapting the gas torque estimation, the maximum allowed SR may be increased, allowing operation at higher SR for the given operating conditions. The gas accuracy test may be carried out again to ensure accurate gas torque estimation after a new source of fuel is introduced (e.g., a fuel tank refill event or coupling of a new fuel tender, or switch from one fuel tank to another), and/or after a predetermined amount of time has elapsed. For example, the gas accuracy test may be carried out each time the engine is started, and then retested periodically to detect tender changes, day to day variation, etc.

At 514, method 500 includes determining if conditions are met for executing a cylinder balance test. The cylinder balance test may be executed when engine speed and/or load are within a threshold range. For example, the cylinder balance test may be executed when full engine power is not necessary (as the test may include disabling each cylinder sequentially). The conditions may further include steady state operation where engine speed and load are not changing (or are changing by less than a threshold amount). Additionally, the conditions may include the engine operating at a given substitution ratio, or within a given substitution ratio range, such as operating with a substitution ratio of 60-80%, or 40-60%.

If the conditions are not met, method 500 loops back to 512. If the conditions are met, method 500 proceeds to 516 to initiate the cylinder balance test. The cylinder balance test may include sequentially adjusting torque in each cylinder and then analyzing the engine speed regulation response upon each cylinder torque change. For example, torque generated by a first cylinder may be decreased by partially or fully deactivating the fuel supply to the first cylinder, while all other cylinders remain fully active. After the system stabilizes, higher fuel amounts are supplied to each remaining active cylinder (relative to the fuel amounts supplied while all cylinders are active) in order to maintain demanded engine speed, and the total gross indicated torque output by the speed regulator (and the total torque demand output by the torque split algorithm) is expected to be maintained at a constant torque value. However, if the partially or fully deactivated first cylinder was receiving excess fuel relative to the other cylinders, and hence contributing extra torque, when the first cylinder torque is reduced, the speed regulator may output a higher total gross indicated torque, in order to command additional fuel be supplied to the remaining cylinders to maintain speed. The first cylinder may contribute extra torque due to a leaky gas admission valve, mis-calibrated fuel injector, or other factor that may cause excess fuel to be supplied to the first cylinder (relative to the other cylinders). On the other hand, if the partially or fully deactivated first cylinder was receiving less fuel relative to the other cylinders (or otherwise was experiencing degraded combustion) leading to a lower torque output from the first cylinder relative to the other cylinders, when the first cylinder torque is reduced, the speed regulator may output a lower total gross indicated torque in order to command less fuel be supplied to the remaining cylinders to maintain speed.

Thus, the cylinder balance test may include identifying if the total gross indicated torque output from the speed regulator changes in response to torque of a cylinder being adjusted (e.g., reduced or increased). If so, that cylinder may be indicated as being out of balance, and a fueling compensation factor may be determined to adjust the fuel supply amount to that cylinder, if possible. For example, if a cylinder is identified as being out of balance due to deactivation of the cylinder causing an increase in the torque output of the speed regulator, a fueling compensation factor may be applied to the fuel injector and/or gas admission valve of that cylinder to cause less fuel to be supplied to that cylinder when the cylinder is reactivated. The process may be repeated for each cylinder of the engine.

At 518, method 500 includes determining if the cylinders of the engine are balanced. The cylinders may be determined to be balanced if the balance test indicated no cylinders were out of balance. If the cylinders are determined to be balanced, method 500 proceeds to 522 to optionally increase the maximum allowed substitution ratio. If the test confirms the cylinders are balanced, the maximum allowed SR may be increased, e.g., from 85% to 90%, given that errors in fueling or combustion among the cylinders are not present. However, the increase in SR upon confirmation of cylinder balance may not be performed each time the cylinders are determined to be balanced. For example, if the cylinder balance test is just reconfirming a prior determination that the cylinders are balanced, the prior maximum SR may remain unchanged.

If at 518 method 500 determines the cylinder are not balanced (e.g., at least one cylinder is identified as being out of balance), method 500 proceeds to 520 to perform compensating fuel adjustments, if possible. As explained above, some forms of cylinder imbalance may be due to errors in fuel metering that may be compensated by adjusting the commanded fuel amounts for that cylinder. However, other types of cylinder imbalance (e.g., due to soot build-up in the cylinder or other issues that degrade combustion) may not be compensated for by adjusting fueling to that cylinder. If a fueling adjustment was made to compensate for the imbalance, and the cylinders are determined to be balanced, the SR may be increased. In contrast, if no adjustments can be made to compensate for the imbalance, degradation may be indicated by notifying an operator and/or setting a diagnostic code. Method 500 then returns.

FIG. 6 is a flow chart illustrating a method 600 for performing a gas accuracy test according to a first example. Method 600 may be performed as part of method 500, for example in response to an indication that the gas accuracy test should be carried out and while the engine is at full power, full speed, and at the highest SR allowed. At 602, method 600 includes initiating an overriding SR with a periodic signal (e.g., sinusoidal, square wave, or other suitable periodic signal) and starting a watchdog timer.

The selected frequency or frequencies for the SR override signal may be any suitable frequencies, however, the frequencies of the override signals chosen may be lower than, and separated from, the bandwidth of the engine speed regulator.

At 604, method 600 includes waiting for the system to reach steady state after the SR override. For example, this may be done by waiting a fixed amount of time or by evaluating the disturbance to engine speed regulation. The predetermined amount of time may be a suitable time based on engine speed, for example, such as 2-5 seconds. At 606, method 600 includes measuring or obtaining signal components (e.g., frequency, phase, and amplitude) of various operating parameters over a set period of time. The measured operating parameters include liquid fuel indicated torque (as determined by Eq. 2 in the torque split algorithm explained above) gaseous fuel indicated torque (as determined by Eq. 1 in the torque split algorithm), substitution ratio (as commanded by the engine controller), torque loss (which may be determined through models based on sensed engine signals including speed, manifold pressure, liquid fuel rail pressure, and oil temperature, and control signals including liquid fuel injected mass), total gross indicated torque (as output by the speed regulator), and engine speed (as measured by one or more crankshaft speed sensors).

At 608, method 600 includes calculating the magnitude and phase of each frequency of interest for each signal. For example, each of the operating parameters measured at 606 may be a signal of one or more frequencies that each have a magnitude and phase. In one example, the frequencies of each of the measured operating parameters may correspond to the frequencies of the SR override signal. At 610, method 600 includes calculating the correction factor for each frequency via Eq. 7, e.g. (liquid torque amplitude—torque loss amplitude)/(gas torque amplitude). At 612, method 600 includes applying a pre-specified gain for each frequency, and averaging the active bins together to generate a single correction factor. For example, at low frequencies, the raw calculation (Fuel/Gas Torque) goes directly to the correct answer in a single measurement period—much like a critically damped system, as there is no attenuation of the disturbance by the speed regulator. At higher frequencies, the speed loop resonance will cause overshoots in the corrector—much like an underdamped regulator. To correct this, and allow for the behavior to be tuned as desired, a Kc around 1 for each frequency will be applied. In an example, the raw correction factor determined according to Eq. 7, for each frequency, may be scaled with Kc. The Kc compensation factor may be based on the closed-loop frequency response of the engine speed regulation, which may be impacted by plant dynamics and controller gains. After this scaling, each active frequency calculation will be averaged and multiplied by the previous correction factor to obtain the new correction factor value, initialized to 1.

At 614, method 600 determines if the final correction factor is a valid correction factor. As mentioned above, the calculation of the correction factor relies on the engine being operated at steady state conditions, where engine speed and engine load are not changing. Otherwise, if engine load or speed were changing during the applied SR disturbance and measuring of the operating parameters during the applied SR disturbance, the changes to the indicated torques, torque loss, etc., would add additional error to the system, preventing isolation of error to the gas torque and confounding the test results. While engine speed is measured at the engine controller, engine load is not necessarily directly measured by the engine controller. Rather, depending on the engine and vehicle architecture and configuration, the engine controller may not be aware of the measured engine load. As one example, in electric traction platforms where engine output is used to drive an alternator to generate electricity for powering one or more traction motors (e.g., the locomotive of FIG. 1), the load placed on the engine by the alternator may result in the actual engine output being different than the gross indicated torque output by the engine speed regulation, and the engine controller may not have a measurement of the alternator load (e.g., due to a split in the emissions critical controls and the emissions non-critical controls). In other examples, the loading on the engine may result from a propeller load, and the engine controller may not have a measurement of the propeller load.

Thus, method 600 may include alternative mechanisms for ensuring the correction factor was calculated during a period where engine load was stable during the SR disturbance. Further, the correction factor may be checked to ensure the directionality is what is to be expected, the engine speed was in a desired range, etc. The validity check may include checking the gas torque phase relative to the substitution ratio phase (e.g., 0°+/−calibration error), the liquid torque phase relative to the substitution ratio phase (e.g., 180°+/−cal.), the torque loss phase relative to the substitution ratio phase (e.g., 180°+/−cal.), a total torque demand phase check (0 or 180+lag, depends on direction of error), using the correction factor direction (>1 or <1) to check that the phase makes sense, a corrector consistency check to ensure that all calculated correction factors for each frequency are in same direction and close in magnitude, that maximum engine speed range during the operating point is less than a threshold, that the engine speed frequency content in bins of interest are less than a threshold, that induced frequencies in engine speed are below thresholds, that the corrector value is within the expected range for the system, and/or that total torque magnitude close to predicted by: TorqueMagnitude_predicted=SR Mag*TotTrq*abs(Corrector−1).

If one or more of the above checks indicates that engine speed or load were changing during the SR disturbance, or if the above checks indicate that engine speed was too low during the SR disturbance (which may cause a less accurate correction factor) or that the correction factor is not rational, the correction factor may be discarded and method 600 may loop back to 606 to continue to measure the operating parameters during the SR disturbance and calculate a new correction factor. If the correction factor is valid, method 600 proceeds to 616 to determine if the size of the correction factor is below a relative threshold. The size of the correction factor may be the absolute value of the correction factor minus one, thereby assessing the magnitude of the correction factor relative to a correction factor of one, which indicates no correction to the gas toque determination is needed. The relative threshold may be a relatively small value near zero, such as 0.05. If the size of the correction factor is below the relative threshold, method 600 proceeds to 618 to indicate a successful adaptation, and then method 600 ends. For example, if the correction factor is determined to be one, or within a 0.05 range of one, no correction is made to the gas torque determination and the test may end by resuming commanded SR for the current operating parameters and proceeding with increasing the SR, if possible, as described above with respect to FIG. 5. In this way, the method may repeatedly measure/correct the error until the measured normalized system gain at each frequency bin is below a threshold: (Total Torque Magnitudes/Average Total Torque)/(SR magnitudes). When this happens, a "complete flag" is set, the correction factor is left as-is and high SR is enabled. The completion flag may expire after a calibrated amount of time.

If the size of the correction factor is not below the relative threshold, method 600 proceeds to 620 to apply the correction factor to the appropriate engine models. For example, the cylinder models 306 of the engine speed regulation of FIG. 3 may output a gas to torque conversion (e.g., the Gas to Trq, also referred to as the gaseous torque estimation) which may be scaled by applying the correction factor. Applying the correction factor may include gradually applying the correction factor by filtering the correction factor and waiting a predetermined amount of time for the system to settle after applying the filtered correction factor, as indicated at 621. For example, if the correction factor is 0.9, a filtered correction factor of 0.95 may be applied and after a predetermined amount of time, the unfiltered correction factor may be applied. The filtering of the correction factor may take on a different form, such as ramping in the correction factor. The filter may include any suitable method of gradually moving the torque corrector value at time t to the final torque corrector value at time t+t_transition. This may include slew limits or low pass filtering, e.g., a first order low pass filter. Further, applying the correction factor may include multiplying the current correction factor by a previously determined correction factor, and then multiplying the gas torque determination by the updated correction factor.

At 622, method 600 determines if the watchdog timer has expired. If the timer has not expired, method 600 loops back to 606 to re-measure the operating parameters and calculate an updated correction factor. The process may repeat itself (calculate updated correction factor, apply the correction factor, calculate a new updated correction factor, apply the new updated correction factor, etc.) until the size of the correction factor drops below the threshold at 616, or until the timer expires at 622.

If the timer has expired without the size of the correction factor falling below the relative threshold, method 600 proceeds to 624 to indicate that the adaptation was unsuccessful, and then method 600 ends. For example, once the adaptation is deemed unsuccessful, the SR disturbance is lifted and the test may be repeated after a predetermined amount of time, as explained above with respect to FIG. 5. In this way, the adaptation of the gas torque estimation may be determined to be successful when the average correction factor value reaches or is within a threshold range of one (e.g., 1+/−0.02), and when the impact on the plant (e.g., engine) is small (e.g., where the percent torque magnitude divided by the substitution ratio signal is less than or equal to a calibration vector,). If the adaptation is successful, the test may be repeated every 4-12 hours, for example. The adaptation of the gas torque estimation may be determined to be unsuccessful if the average correction factor value does not reach the threshold range of one upon expiration of the timer. In such an example, the test may be retried after a predetermined amount of time, such as five minutes.

Thus, method 600 of FIG. 6 calculates a correction factor to be applied to a gas torque calculation, in order to reduce error in the gas torque determination due to gas admission valve flow coefficient variations and/or energy content of the gaseous fuel (which may vary from source to source and/or over time). The correction factor may be calculated by periodically introducing a disturbance to the substitution ratio, thereby changing the amount of gaseous fuel supplied to the engine as well as a corresponding change to the amount of liquid fuel supplied to the engine. If the engine speed and engine load are held steady during the SR disturbance, and assuming the determination of the liquid fuel torque is not prone to error, any error in the engine controller's determination of commanded torque upon changing the SR may be attributed to error in the gas torque determination, which may be represented as the correction factor and applied to the gas torque determination to reduce the error. By relying on a periodic disturbance to the SR, small disturbances to the SR may be made (e.g., 10% change in SR), the time to calibrate is not a function of error magnitude, the test has a more robust signature than discrete steps (phases and amplitudes of four signals need to line up properly), the test allows for multiple frequencies to be checked at once, and the test can be calibrated to behave as desired (single step, overdamped, underdamped, etc.). However, the multiple periodic signals relies on a complex calculation. Thus, to save on processing resources, a discrete step correction factor calculation may be performed instead, as described below.

FIG. 7 is a flow chart illustrating a method 800 for performing a gas accuracy test according to a second example. Method 800 may be executed as part of method 500, for example in response to an indication to perform a gas accuracy test and once the engine is at full power, full speed, and at the highest SR allowed. At 802, method 800 includes obtaining and/or measuring engine speed, engine power, torques (gas torque, liquid fuel torque, total torque, torque losses), etc., at a first steady state operating point (point 1). At 804, method 800 includes reducing the substitution ratio. For example, the substitution ratio may have been 60% at point 1, and the substitution ratio may be dropped to 0% at 804. At 806, method 800 determines if the engine controller (otherwise referred to as the engine control unit, or ECU) has detected a shift in the engine speed or load. Various methods may be used to determine speed load shift and steady state conditions, for example based on a magnitude of torque trailing ranges during the point 1 measurement, fixed thresholds, and/or a fast/slow filter convergence.

If a shift in speed and/or load is not detected due to the change in SR, method 800 proceeds to 808 to indicate that the current correction factor (X) is correct, and the method then waits to recheck the gas accuracy at some later time. Because the change in SR did not induce a change in engine speed or load, the controller assumes that the gaseous torque estimation is accurate and does not proceed to calculate a new correction factor for the gaseous torque estimation. Method 800 then loops back to 802 to evaluate the operating parameters at a next steady state point.

If a shift in the speed or load due to the change in SR is detected, method 800 proceeds to 810 to evaluate (e.g., measure and/or obtain) the speed, power, torques, etc., at the second operating point (point 2), which may be a similar commanded operating point as point 1, with the exception of the lower substitution ratio. At 812, method 800 includes restoring the substitution ratio (e.g., back to 60%), and at 814, method 800 includes evaluating the speed, power, torques, etc., at the third operating point (point 3), which is similar to the conditions as the first operating point. At 816, method 800 determines if point 1 is approximately equal to point 3. If no, for example if the engine speed or gross indicated torque changed from point 1 to point 3, method 800 proceeds to 818 to discard the data obtained at points 1, 2, and 3, and then method 800 loops back to 802 to repeat the process. If point 1 is equal to point 3, method 800 proceeds to 820 to calculate and apply the correction factor based on points 1, 2, and 3. For example, the data obtained from point 1 and point 2 may be entered into Eq. 6 to determine $X_1$, and then the data obtained from point 2 and point 3 may be entered into Eq. 6 to determine $X_2$, and $X_1$ and $X_2$ may be averaged to arrive at a final X; alternatively, the data from points 1 and 3 may be averaged and then the averaged data, along with the data from point 2, may be entered into Eq. 6 to calculate X. The correction factor may be applied in the same manner as described above with respect to FIG. 6, e.g., filtered and applied gradually. Method 800 then loops back to 802 to continue to obtain data at each of two or more operating points where the SR is lowered in at least one operating point, in order to iteratively calculate and adjust the correction factor. One "cycle" of the test may include any number of points greater than two, as additional points add time and robustness.

FIG. 8 is a graph 900 showing gas torque, diesel torque, and total torque over time during the execution of method 800, for example. Graph 900 includes torque (Nm) depicted along the y-axis and time (min) depicted along the x-axis. Total torque is shown by curve 902, the gas torque (gas component of the total torque) is shown by curve 904, and the diesel torque (diesel component of the total torque) is shown by curve 906. Prior to time t1, the total, gas, and diesel torques are all constant, with the substitution ratio being approximately 60%, the gas torque being approximately 20,000 Nm, and diesel torque being approximately 13,000 Nm. At time t1, the substitution ratio drops to 0%, and thus the gas torque is zero and the diesel torque is equal to the total torque. At time t2, after stabilizing, the total torque has dropped to approximately 30,000 Nm, from 33,000 Nm prior to time t1. The correction factor may be determined according to Eq. 6, using the gas torque and diesel torque at time t2 and prior to time t1:

$$\left(\frac{T_{dsl1} - T_{dsl2}}{T_{gas2} - T_{gas1}}\right)_{ECU} = \frac{13,000 - 30,000}{0 - 20,000} = 0.85$$

At time t3, the substitution ratio is restored and the system returns to the same state as at t1, so the correction factor is gradually applied, completing at time t4. As appreciated by the torques at time t4, the total torque is lower at time t4 than prior to time t1, but more consistent with the torque at t2, indicating that the correction factor has been applied, thereby lowering the determination of the gas torque. Further, both the diesel torque and gas torque components are lower.

At time t5, another gas accuracy test is initiated, and thus the substitution ratio is again lowered to zero. After stabilization, such as at time t6, the correction factor is calculated, using the toques at time t6 relative to time t4, for example. However, because application of the correction factor between time t3 and t4 reduced or eliminated the gas torque error, the new correction factor calculated at time t6 may be equal to one (or within a threshold of one) and thus additional correction is not needed. At time t7, the substitution ratio is restored.

Thus, method 800 of FIG. 7 calculates a correction factor using data obtained at discrete points of time, thus a single or small number of step(s) may be performed and the derived equation may be used to directly calculate X. This approach may be beneficial, as only a single trial may be needed to get an accurate correction factor, the time to calibrate is not a function of error magnitude, and it is an unambiguous process with a clear end. However, the approach requires robust validation/disturbance rejection and a large SR reduction, leading to larger variation in operating point and more dependence on models.

FIG. 9 is a flow chart illustrating a method 1000 for performing a gas accuracy test according to a third example. The example test shown in FIG. 9 includes a converging approach including smaller steps, with incremental adjustments until the final X is converged upon. Such an approach may be advantageous as one bad trial will not affect the final outcome (provided >50% "good" trials) and a smaller SR reduction may be applied. However, the approach may be susceptible to noise in torque output, and the final output is a "random walk" around true answer or limited to some steady state error. Thus, the selection of performing the gas accuracy test according the first example, second example, or third example may include trade-offs among desired benefits and acceptable drawbacks.

Method 1000 may be executed as part of method 500, for example in response to an indication to perform a gas accuracy test and once the engine is at full power, full speed, and at the highest SR allowed. At 1002, method 1000 includes obtaining and/or measuring engine speed, engine power, torques (gas torque, liquid fuel torque, total torque, torque losses), etc., at a first steady state operating point (point 1). At 1004, method 1000 includes reducing the substitution ratio. For example, the substitution ratio may have been 60% at point 1, and the substitution ratio may be dropped to 0% at 1004. At 1006, method 1000 determines if the engine controller (otherwise referred to as the engine control unit, or ECU) has detected a shift in the engine speed or load. Various methods may be used to determine speed load shift and steady state conditions, for example based on a magnitude of torque trailing ranges during the point 1 measurement, fixed thresholds, and/or a fast/slow filter convergence.

If a shift in speed and/or torque is not detected due to the change in substitution ratio method 1000 proceeds to 1008 to indicate that the current correction factor (X) is correct, and the method then waits to recheck the gas accuracy at some later time. Method 1000 then loops back to 1002 to evaluate the operating parameters at a next steady state point. As explained above with respect to FIG. 7, because the change in substitution ratio does not induce a change in engine speed or torque, the controller assumes the current correction factor is accurately accounting for any gaseous torque estimation errors, and thus the controller does not calculate a new correction factor.

If a shift in the speed or torque is detected in response to the change in substitution ratio, method 1000 proceeds to 1010 to evaluate (e.g., measure and/or obtain) the speed, power, torques, etc., at the second operating point (point 2), which may be a similar operating point as point 1, with the exception of the lower substitution ratio. At 1012, method 1000 includes restoring the substitution ratio (e.g., back to 60%), and at 1014, method 1000 includes determining if the ECU's perceived power went up. For example, the total gross indicated torque output by the speed regulator may be evaluated to determine if the torque increased upon dropping the substitution ratio.

If no, for example if the gross indicated torque went down or stayed steady, method 1000 proceeds to 1016 to increment the correction factor down, for example by a predetermined amount (such as 0.01), and then method 1000 loops back to 1002 to repeat the process. If the perceived power did go up, for example if the gross indicated torque increased, method 1000 proceeds to 1018 to increment the correction factor upwards, for example by a predetermined amount (e.g., 0.01). Method 1000 then loops back to 1002 to continue to obtain data at each of two or more operating points where the SR is lowered in at least one operating point, in order to iteratively adjust the correction factor. The process may be repeated until convergence at the proper correction factor. The increment size may be fixed, as explained above, or proportional to the total torque shift. For example, if the gross indicated torque increases by a first, larger amount, the correction factor may be incremented upwards by a first, larger amount, relative to when the gross indicated torque increases by a second, smaller amount. Further, additional points/error checking similar to those described above with respect to FIG. 7 may be added.

Figure 10:
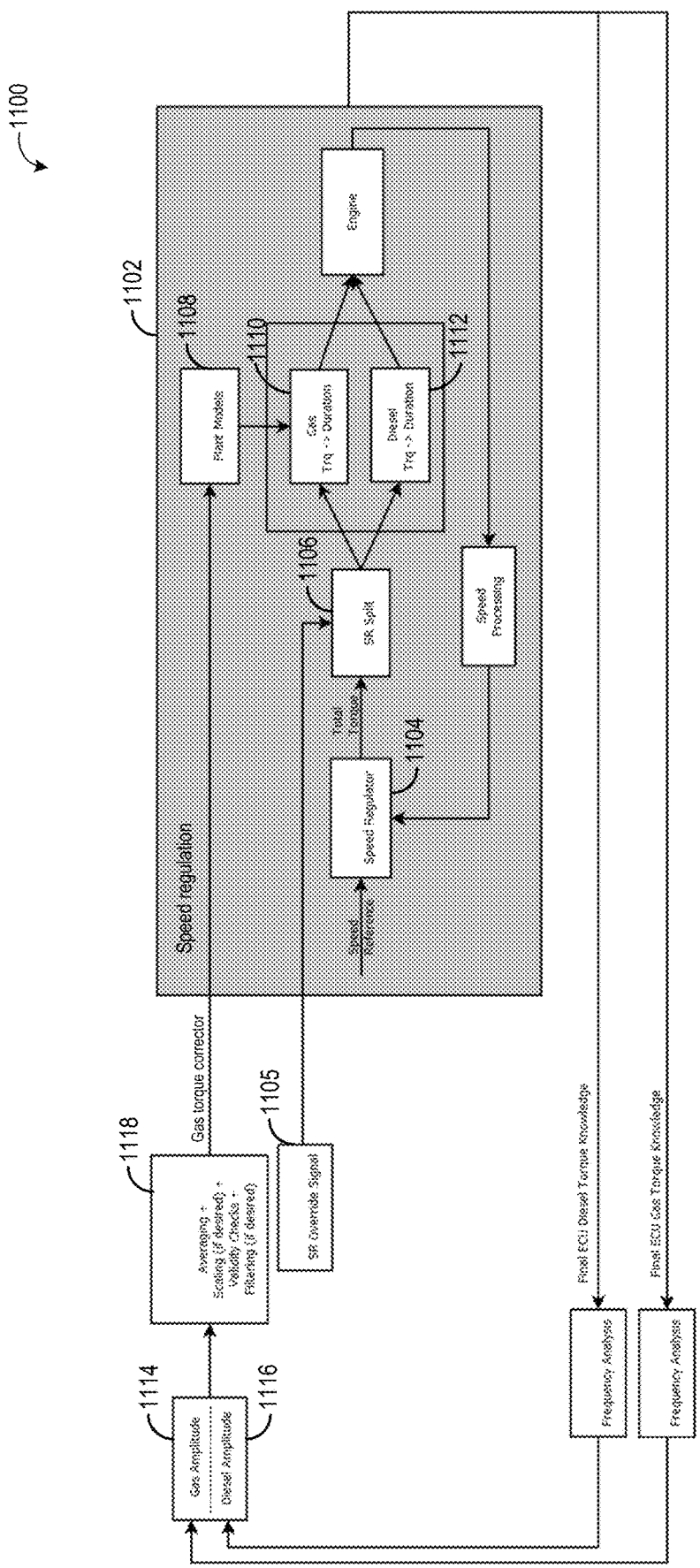
FIG. 10 is a control diagram showing interaction between the fuel accuracy test and the engine speed regulation.

Turning now to FIG. 10, a control diagram 1100 is illustrated that shows the interaction between the gas accuracy test and the engine speed regulation. A simplified version of the engine speed regulation 1102 is shown. The engine speed regulation includes the speed regulator 1104, which utilizes a speed reference and measured engine speed to produce a total toque command that is output to the toque split algorithm (referred to here as the SR split 1106), which calculates torque commands for the gaseous fuel and the liquid (e.g., diesel) fuel based on the commanded substitution ratio and then determines fuel amounts based on the calculated torque commands. During a gas accuracy test, an override to the commanded substitution ratio may be sent to the SR split 1106 via an SR override signal 1105. For example, the SR override signal may have a phase, amplitude, and frequency, and may be comprised of multiple frequency components in some examples. Using the plant models 1108, the gas torque command is converted into an open duration for the gas admission valves at 1110 and the liquid fuel torque command is converted into a fuel injector open duration at 1112.

The engine speed regulation outputs the final ECU diesel torque knowledge signal and the final ECU gas torque knowledge signal. Frequency analysis is performed on each signal to determine the gas amplitude 1114 and diesel amplitude 1116. The amplitudes are input into block 1118, where averaging, scaling (if desired), validity checks, and filtering (if desired) are performed to determine the final correction factor, which is then input to the plant models 1108 to correct the gas torque determination.

The SR override signal 1105 may be a periodic signal (sine, saw, or other shape). The frequency analysis performed on the gas torque knowledge and diesel torque knowledge signals and/or the analysis performed at block 1118 may include multiple calculations on various frequencies for redundancy, and also to check for phase relationships—that the gas and diesel are 180 degrees apart, the total torque is in phase (allowing for some lag) with the SR if the correction factor is less than one, and that the total toque is 180 degrees plus some lag with the SR if the correction factor is greater than one. Further, a check may be performed for the total torque frequency content being close to the predicted gas error.

The frequency analysis described above may utilize the Goertzel algorithm or fast Fourier transform, to determine the phase and magnitude of the applicable signals at the frequencies of interest.

The technical effect of determining and applying a gas torque correction factor is that more accurate substitution ratios may be applied during engine operation, allowing for operation at higher substitution ratios, thereby lowering fuel costs.

In another representation, a system for an engine includes a controller with computer readable instructions stored on non-transitory memory that when executed during operation of the engine cause the controller to: operate the engine at a first substitution ratio of gaseous fuel and liquid fuel; adjust the first substitution ratio to a second substitution ratio and operate the engine with the second substitution ratio; upon operating the engine with the second substitution ratio, maintain engine speed at a target speed by feedback adjusting an amount of gaseous fuel and an amount of liquid fuel while maintaining the second substitution ratio; correlate the feedback adjustments in the amounts of liquid and gaseous fuel to error in gas admission valve gaseous fuel delivery; and adjust control of gas admission valve operation based on the error. In a first example of the system, the instructions further cause the controller to, upon adjusting control of the gas admission valve operation based on the error, adjust the second substitution ratio to a third substitution ratio. In a second example of the system, which optionally includes the first example, the first substitution ratio is a maximum substitution ratio for current operating parameters of the engine, and the third substitution ratio is an increased maximum substitution ratio for the current operating parameters of the engine. In a third example of the system, which optionally includes one or both of the first and second examples, the adjusting of the first substitution ratio to the second substitution ratio is performed in response to a command to carry out a gas accuracy test, the gas accuracy test including the feedback adjusting of the amount of gaseous fuel and the amount of liquid fuel and the correlating of the feedback adjustments in the amounts of liquid and gaseous fuel to the error. In some examples, the adjusting of the first substitution ratio to the second substitution ratio is performed while engine speed and/or load are not changing.

In another representation, a method includes operating an engine at a first substitution ratio of gaseous fuel and liquid fuel; correcting for relative error between a gaseous fuel to torque conversion factor and a liquid fuel to torque conversion factor; upon correcting for the relative error, operating the engine at a second substitution ratio, higher than the first substitution ratio; correcting for cylinder to cylinder torque imbalances; and upon correcting for the cylinder to cylinder torque imbalances, operating the engine at a third substitution ratio, higher than the second substitution ratio. In a first example of the method, the method further includes determining a first amount of gaseous fuel to supply to the engine based at least in part on the gaseous fuel to torque conversion factor and the first substitution ratio; determining a second amount of liquid fuel to supply to the engine based at least in part on the liquid fuel to torque conversion factor and the first substitution ratio; and wherein operating the engine at the first substitution ratio includes supplying the first amount of gaseous fuel and the second amount of liquid fuel to the engine. In a second example of the method, which optionally includes the first example, the first amount of gaseous fuel and second amount of liquid fuel are further determined at least in part on a commanded torque, and wherein the commanded torque is determined based at least in part on engine speed. In a third example of the method, which optionally includes one or both of the first and second examples, correcting for the relative error between the gaseous fuel to torque conversion factor and the liquid fuel to torque conversion factor comprises: after operating the engine at the first substitution ratio, operating the engine with a varying substitution ratio; while the engine is operating with the varying substitution ratio, measuring resultant disturbances to gas torque and liquid fuel torque, the gas torque determined based at least in part on the commanded torque, substitution ratio, and gaseous fuel to torque conversion factor, the liquid fuel torque determined based at least in part on the commanded torque, substitution ratio, and liquid fuel to torque conversion factor; and determining the relative error based at least in part on the disturbances to the gas torque and liquid fuel torque. In a fourth example of the method, which optionally includes one or more or each of the first through third examples, the second substitution ratio is higher than the first substitution ratio. In a fifth example of the method, which optionally includes one or more or each of the first through fourth examples, the third substitution ratio is higher than the second substitution ratio.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

In another representation, a method for an engine includes operating the engine at a first substitution ratio of gaseous fuel and liquid fuel; correcting for relative error between a gaseous torque estimation and a liquid torque estimation; and upon correcting for the relative error, operating the engine at a second substitution ratio, different than the first substitution ratio. In a first example of the method, the method further includes determining a first amount of gaseous fuel to supply to the engine based at least in part on the gaseous torque estimation and the first substitution ratio; determining a second amount of liquid fuel to supply to the engine based at least in part on the liquid torque estimation and the first substitution ratio; and wherein operating the engine at the first substitution ratio includes supplying the first amount of gaseous fuel and the second amount of liquid fuel to the engine. In a second example of the method, which optionally includes the first example, the first amount of gaseous fuel and second amount of liquid fuel are further determined at least in part on a commanded torque, and wherein the commanded torque is determined based at least in part on engine speed. In a third example of the method, which optionally one or both of the first and second examples, correcting for the relative error between the gaseous torque estimation and the liquid torque estimation comprises: after operating the engine at the first substitution ratio, operating the engine with a varying substitution ratio; while the engine is operating with the varying substitution ratio, measuring resultant disturbances to gas torque and liquid fuel torque, the gas torque determined based at least in part on the commanded torque, substitution ratio, and gaseous torque estimation, the liquid fuel torque determined based at least in part on the commanded torque, substitution ratio, and liquid torque estimation; and determining the relative error based at least in part on the disturbances to the gas torque and liquid fuel torque. In a fourth example of the method, which optionally includes one or more or each of the first through third examples, the first substitution ratio is a first maximum substitution ratio commanded based on one or more current operating parameters of the engine, the second substitution ratio is a second maximum substitution ratio, and the method further includes increasing the first maximum substitution ratio to the second maximum substitution ratio upon correcting for the relative error. In a fifth example of the method, which optionally includes one or more or each of the first through fourth examples, the method further includes correcting for cylinder to cylinder torque imbalances; and upon correcting for the cylinder to cylinder torque imbalances, operating the engine at a third substitution ratio, different than the second substitution ratio, wherein the third substitution ratio is higher than the second substitution ratio.

In another representation, a method for an engine includes operating the engine with a first amount of gaseous fuel and a second amount of liquid fuel determined according to engine speed, a gaseous torque estimation, a liquid torque estimation, and a first substitution ratio; determining a relative error between the gaseous torque estimation and the liquid torque estimation; correcting the gaseous torque estimation based at least in part on the relative error; and operating the engine with a third amount of gaseous fuel and a fourth amount of liquid fuel determined based at least in part on the corrected gaseous torque estimation and the liquid torque estimation. In a first example of the method, a second substitution ratio is determined based on the third amount and fourth amount, and at least in part on the engine speed. In a second example of the method, which optionally includes the first example, in order to determine the relative error between the gaseous torque estimation and the liquid torque estimation, the method further includes: periodically adjusting the first substitution ratio at a first frequency, a first amplitude, and a first phase; while the first substitution ratio is periodically adjusted, measuring frequency components of a gas torque signal and a liquid fuel torque signal, the gas torque signal based at least in part on the gaseous torque estimation, the liquid fuel torque signal based at least in part on the liquid torque estimation; and determining the relative error based at least in part on an amplitude of the gas torque signal relative to an amplitude of the liquid fuel torque signal. In a third example of the method, which optionally includes one or both of the first and second examples, if a frequency and/or phase of one or more of the gas torque signal and the liquid fuel torque signal does not match the first frequency and/or first phase, the method further includes discarding the gas torque signal and the liquid fuel torque signal and, after a predetermined duration has elapsed, re-measuring frequency components of the gas torque signal and the liquid fuel torque signal while the first substitution ratio is periodically adjusted. In a fourth example of the method, which optionally includes one or more or each of the first through third examples, the method further includes, in order to estimate the relative error between the gaseous torque estimation and the liquid torque estimation, operating the engine with a fifth amount of gaseous fuel and a sixth amount of liquid fuel determined according to the gaseous torque estimation, the liquid torque estimation, engine speed, and a third substitution ratio, different than the first and second substitution ratios; calculating a first gas torque value based at least in part on the first amount of gaseous fuel and the gaseous torque estimation and calculating a second gas torque value based at least in part on the fifth amount of gaseous fuel and the gaseous torque estimation; calculating a first liquid fuel torque value based at least in part on the second amount of liquid fuel and the liquid torque estimation and calculating a second liquid torque value based at least in part on the sixth amount of liquid fuel and the liquid torque estimation; and estimating the relative error based at least in part on first gas torque value, the second gas torque value, the first liquid fuel torque value, and the second liquid fuel torque value. In a fifth example of the method, which optionally includes one or more or each of the first through fourth examples, the method includes controlling engine load by controlling a load placed on the engine by an alternator.

In another representation, a method for an engine includes operating the engine at a variable substitution ratio of gaseous fuel and liquid fuel while adjusting amounts of gaseous fuel and liquid fuel to maintain torque; maintaining engine speed at a target speed by feedback adjusting the amounts of gaseous fuel and liquid fuel while varying the substitution ratio; correlating the feedback adjustments in the amounts of gaseous fuel and liquid fuel to error in gas admission valve gaseous fuel delivery; and adjusting control of gas admission valve operation based on the error. In a first example of the method, the method includes prior to operating the engine at the variable substitution ratio, operating the engine at a commanded substitution ratio that is based on current engine operating parameters, including operating the engine at a first maximum substitution ratio when the current operating parameters include full power. In a second example of the method, which optionally includes the first example, the method includes, upon adjusting control of the gas admission valve operation, operating the engine at a second maximum substitution ratio when the current operating parameters include full power, the second maximum substitution ratio greater than the first maximum substitution ratio. In a third example of the method, which optionally includes one or both of the first and second examples, operating the engine at the variable substitution ratio includes periodically adjusting the substitution ratio at a first frequency, a first amplitude, and a first phase; correlating the feedback adjustments in the amounts of gaseous fuel and liquid fuel to the error in gas admission valve gaseous fuel delivery includes: measuring frequency components of a gas torque signal and a liquid fuel torque signal, the gas torque signal and the liquid fuel torque signal determined from the feedback adjustments; and determining the error based at least in part on an amplitude of the gas torque signal relative to an amplitude of the liquid fuel torque signal. In a fourth example of the method, which optionally includes one or more or each of the first through third examples, adjusting control of gas admission valve operation based on the error includes adjusting an open duration of one or more gas admission valves of the engine. In a fifth example of the method, which optionally includes one or more or each of the first through fourth examples, the method includes indicating degradation of a gaseous fuel system configured to deliver the gaseous fuel to the engine responsive to a magnitude of the error being outside a threshold range. In a sixth example of the method, which optionally includes one or more or each of the first through fifth examples, the method includes initiating the operating of the engine at the variable substitution ratio during steady state conditions following an engine start event.

As used herein, the terms "approximately" and "about" are construed to mean plus or minus five percent of the range unless otherwise specified.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, comprising:
a controller with computer readable instructions stored on non-transitory memory that when executed during operation of the engine cause the controller to:
operate the engine at a first substitution ratio of gaseous fuel and liquid fuel;
correct for relative error between a gaseous torque estimation and a liquid torque estimation; and
upon correcting for the relative error, operate the engine at a second substitution ratio, different than the first substitution ratio.

2. The system of claim 1, wherein the instructions further cause the controller to:
determine a first amount of gaseous fuel to supply to the engine based at least in part on the gaseous torque estimation and the first substitution ratio;
determine a second amount of liquid fuel to supply to the engine based at least in part on the liquid torque estimation and the first substitution ratio; and
operate the engine at the first substitution ratio includes supplying the first amount of gaseous fuel and the second amount of liquid fuel to the engine.

3. The system of claim 1, wherein the first amount of gaseous fuel and second amount of liquid fuel are further determined at least in part on a commanded torque, and wherein the commanded torque is determined based at least in part on engine speed.

4. The system of claim 1, wherein correcting for the relative error between the gaseous torque estimation and the liquid torque estimation comprises:
after operating the engine at the first substitution ratio, operating the engine with a varying substitution ratio;
while the engine is operating with the varying substitution ratio, measuring resultant disturbances to gas torque and liquid fuel torque, the gas torque determined based at least in part on the commanded torque, substitution ratio, and gaseous torque estimation, the liquid fuel torque determined based at least in part on the commanded torque, substitution ratio, and liquid torque estimation; and
determining the relative error based at least in part on the disturbances to the gas torque and liquid fuel torque.

5. The system of claim 1, wherein the rail vehicle is a locomotive.

6. The system of claim 1, wherein the first substitution ratio is a first maximum substitution ratio commanded based on one or more current operating parameters of the engine, wherein the second substitution ratio is a second maximum substitution ratio, and wherein the instructions further cause the controller increase the first maximum substitution ratio to the second maximum substitution ratio upon correcting for the relative error.

7. The system of claim 1, wherein the instructions further cause the controller to:
correct for cylinder to cylinder torque imbalances; and
upon correcting for the cylinder to cylinder torque imbalances, operate the engine at a third substitution ratio, different than the second substitution ratio, wherein the third substitution ratio is higher than the second substitution ratio.

8. A system for an engine, comprising:
a controller with computer readable instructions stored on non-transitory memory that when executed during operation of the engine cause the controller to:
operate the engine with a first amount of gaseous fuel and a second amount of liquid fuel determined according to engine speed, a gaseous torque estimation, a liquid torque estimation, and a first substitution ratio;
determine a relative error between the gaseous torque estimation and the liquid torque estimation;
correct the gaseous torque estimation based at least in part on the relative error; and
operate the engine with a third amount of gaseous fuel and a fourth amount of liquid fuel determined based at least in part on the corrected gaseous torque estimation and the liquid torque estimation.

9. The system of claim 8, wherein a second substitution ratio is determined based on the third amount and fourth amount, and at least in part on the engine speed.

10. The system of claim 8, wherein, in order to determine the relative error between the gaseous torque estimation and the liquid torque estimation, the instructions further cause the controller to:
periodically adjust the first substitution ratio at a first frequency, a first amplitude, and a first phase;
while the first substitution ratio is periodically adjusted, measure frequency components of a gas torque signal and a liquid fuel torque signal, the gas torque signal based at least in part on the gaseous torque estimation, the liquid fuel torque signal based at least in part on the liquid torque estimation; and
determine the relative error based at least in part on an amplitude of the gas torque signal relative to an amplitude of the liquid fuel torque signal.

11. The system of claim 8, wherein if a frequency and/or phase of one or more of the gas torque signal and the liquid fuel torque signal does not match the first frequency and/or first phase, the instructions cause the controller to discard the gas torque signal and the liquid fuel torque signal and, after a predetermined duration has elapsed, re-measure frequency components of the gas torque signal and the liquid fuel torque signal while the first substitution ratio is periodically adjusted.

12. The system of claim 8, wherein, in order to estimate the relative error between the gaseous torque estimation and the liquid torque estimation, the instructions further cause the controller to:
operate the engine with a fifth amount of gaseous fuel and a sixth amount of liquid fuel determined according to the gaseous torque estimation, the liquid torque estimation, engine speed, and a third substitution ratio, different than the first and second substitution ratios;
calculate a first gas torque value based at least in part on the first amount of gaseous fuel and the gaseous torque estimation and calculate a second gas torque value based at least in part on the fifth amount of gaseous fuel and the gaseous torque estimation;
calculate a first liquid fuel torque value based at least in part on the second amount of liquid fuel and the liquid torque estimation and calculate a second liquid torque value based at least in part on the sixth amount of liquid fuel and the liquid torque estimation; and
estimate the relative error based at least in part on first gas torque value, the second gas torque value, the first liquid fuel torque value, and the second liquid fuel torque value.

13. The system of claim 8, wherein the controller is further configured to control engine load by controlling a load placed on the engine by an alternator.

14. A system for an engine, comprising:
a controller with computer readable instructions stored on non-transitory memory that when executed during operation of the engine cause the controller to:

operate the engine at a variable substitution ratio of gaseous fuel and liquid fuel while adjusting amounts of gaseous fuel and liquid fuel to maintain torque;

maintain engine speed at a target speed by feedback adjusting the amounts of gaseous fuel and liquid fuel while varying the substitution ratio;

correlate the feedback adjustments in the amounts of gaseous fuel and liquid fuel to error in gas admission valve gaseous fuel delivery; and adjust control of gas admission valve operation based on the error.

15. The system of claim 14, wherein the instructions further cause the controller to:

prior to operating the engine at the variable substitution ratio, operate the engine at a commanded substitution ratio that is based on current engine operating parameters, including operating the engine at a first maximum substitution ratio when the current operating parameters include full power.

16. The system of claim 15, wherein the instructions further cause the controller to, upon adjusting control the gas admission valve operation, operate the engine at a second maximum substitution ratio when the current operating parameters include full power, the second maximum substitution ratio greater than the first maximum substitution ratio.

17. The system of claim 14, wherein operating the engine at the variable substitution ratio includes periodically adjusting the substitution ratio at a first frequency, a first amplitude, and a first phase;

wherein correlating the feedback adjustments in the amounts of gaseous fuel and liquid fuel to the error in gas admission valve gaseous fuel delivery includes:

measuring frequency components of a gas torque signal and a liquid fuel torque signal, the gas torque signal and the liquid fuel torque signal determined from the feedback adjustments; and determining the error based at least in part on an amplitude of the gas torque signal relative to an amplitude of the liquid fuel torque signal.

18. The system of claim 14, wherein adjusting control of gas admission valve operation based on the error includes adjusting an open duration of one or more gas admission valves of the engine.

19. The system of claim 14, wherein the instructions further cause the controller to indicate degradation of a gaseous fuel system configured to deliver the gaseous fuel to the engine responsive to a magnitude of the error being outside a threshold range.

20. The system of claim 14, wherein the instructions further cause the controller to initiate the operating of the engine at the variable substitution ratio during steady state conditions following an engine start event.

* * * * *